(12) United States Patent
Horio et al.

(10) Patent No.: US 8,986,843 B2
(45) Date of Patent: Mar. 24, 2015

(54) OPTICAL LAYERED BODY, POLARIZER AND IMAGE DISPLAY DEVICE

(75) Inventors: Tomoyuki Horio, Tokyo (JP); Mariko Hayashi, Tokyo (JP); Kiyotaka Matsui, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 508 days.

(21) Appl. No.: 12/585,135

(22) Filed: Sep. 4, 2009

(65) Prior Publication Data

US 2010/0067109 A1    Mar. 18, 2010

(30) Foreign Application Priority Data

Sep. 5, 2008   (JP) ................... 2008-228906

(51) Int. Cl.
  G02B 1/08   (2006.01)
  G02B 5/30   (2006.01)
  B32B 5/16   (2006.01)
(52) U.S. Cl.
  CPC .............. G02B 1/111 (2013.01); G02B 5/3033 (2013.01)
  USPC .......................... 428/421; 428/318.4; 359/586
(58) Field of Classification Search
  CPC .............................. G02B 1/111; G02B 5/3033
  USPC ................... 428/420, 421, 422, 318.4, 411.1; 522/71; 359/586
  See application file for complete search history.

(56) References Cited

U.S. PATENT DOCUMENTS

| | | | |
|---|---|---|---|
| 2005/0261389 A1* | 11/2005 | Bratolavsky et al. | ............ 522/71 |
| 2006/0181774 A1* | 8/2006 | Ojima et al. | .................. 359/586 |
| 2008/0174875 A1* | 7/2008 | Iwata et al. | .................... 359/599 |
| 2008/0292866 A1* | 11/2008 | Shinohara et al. | ......... 428/318.4 |

FOREIGN PATENT DOCUMENTS

| | | |
|---|---|---|
| JP | 2001-100004 A | 4/2001 |
| JP | 2003-292831 A | 10/2003 |
| JP | 2004-272198 A | 9/2004 |
| JP | 2006-257407 A | 9/2006 |
| JP | 2007-016085 A | 1/2007 |
| JP | 2008019402 A * | 1/2008 |
| JP | 2008-169364 A | 7/2008 |
| JP | 2009167295 A * | 7/2009 |

OTHER PUBLICATIONS

Ohkawa et al., Studies on fouling by the freshwater mussel *Limnoperna fortunei* and the antifouling effects of low energy surfaces, Biofouling, 1999, vol. 13: 4, Abstract.*
ChemicalBook, http://www.chemicalbook.com/ChemicalProductProperty_EN_CB2673282.htm, 1H,1H,2H,2H-heptadecafluorodecyl acrylate, retrieved Dec. 12, 2011, pp. 1-2.*
Machine Translation of JP 2009167295 A (2009).*

* cited by examiner

*Primary Examiner* — Callie Shosho
*Assistant Examiner* — Patrick English
(74) *Attorney, Agent, or Firm* — Novak Druce Connolly Bove + Quigg LLP

(57) ABSTRACT

The present invention has its object to provide an optical layered body having sufficient hardness and an even surface, including a low refractive index layer having a sufficiently low refractive index, and having excellent antireflection properties. optical layered body of the present invention comprises: at least a low refractive index layer on a light-transmitting substrate, wherein said low refractive index layer is formed by using a composition for a low refractive index layer, said composition comprising a hollow silica fine particle and an organic binder, said organic binder containing: a fluorine atom-free polyfunctional monomer having three or more reactive functional groups in one molecule; a fluorine atom-containing monomer; and a fluorine atom-containing polymer.

10 Claims, 1 Drawing Sheet
(1 of 1 Drawing Sheet(s) Filed in Color)

OPTICAL LAYERED BODY, POLARIZER AND IMAGE DISPLAY DEVICE

This application claims priority from Japanese Application 2008-228906, filed Sep. 5, 2008.

TECHNICAL FIELD

The present invention relates to an optical layered body, a polarizer, and an image display device.

BACKGROUND ART

An image display surface of an image display device, such as a cathode-ray tube (CRT) display device, a liquid crystal display (LCD), a plasma display (PDP), an electroluminescence display (ELD), and a field emission display (FED), is required to reduce reflection with the light irradiated from the external light source and improve visibility thereof. In order to fulfill the requirement, typically, reflection of the image display surface of an image display device is reduced and visibility thereof is improved, by employing an optical layered body in which an antireflection layer is formed on a light-transmitting substrate.

As the optical layered body having an antireflection layer, there is conventionally known a structure in which a low refractive index layer having a refractive index lower than that of a light-transmitting substrate is provided on the outermost surface.

The low refractive index layer is required to have a low refractive index for the purpose of improving antireflection properties of the optical layered body, to have high hardness for damage prevention because the low refractive index layer is provided on the outermost surface, and to have excellent optical properties such as transparency.

As an optical layered body in which a low refractive index layer is formed on the outermost surface, Patent Document 1, for example, discloses an optical layered body that has a low refractive index layer having a structure that contains hollow silica fine particles thereinside by using a coating liquid containing hollow silica fine particles, a binder resin such as acrylate, and the like.

The display quality required of an image display device, however, has been very high in recent years, and a higher level of antireflection properties of an optical layered body has also been increasingly demanded.

However, the optical layered body in which the conventional low refractive index layer including hollow silica fine particles is provided does not have sufficient antireflection properties and does not satisfy the demand for a high display quality in recent years.

On the other hand, as a method for further reducing a refractive index of a low refractive index layer, Patent Document 2, for example, discloses a method for blending a fluorine atom-containing polymer or monomer in a binder of the low refractive index layer. Since the fluorine atom-containing polymer or monomer is a material with a low refractive index, it is possible to reduce a refractive index of the low refractive index layer containing these in comparison with the conventional low refractive index layer including hollow silica fine particles.

However, when the conventional low refractive index layer containing a fluorine atom-containing polymer or monomer contains these compounds to such an extent that the refractive index is sufficiently reduced, problematically, the hardness of the low refractive index layer may be insufficient, cissing may arise upon applying the composition at the time of forming the low refractive index layer, and a low refractive index layer having an even surface may not be obtained.

Accordingly, there has been required an optical layered body having sufficient hardness and an even surface, including a low refractive index layer having a lower refractive index, and having high antireflection properties.

Patent Document 1: JP-A 2003-292831
Patent Document 2: JP-A 2001-100004

SUMMARY OF THE INVENTION

In view of the above-mentioned state of the art, it is an object of the present invention to provide: an optical layered body having sufficient hardness and an even surface, including a low refractive index layer having a sufficiently low refractive index, and having excellent antireflection properties; a polarizer and a non-self-luminous image display device formed by using the optical layered body.

The present invention relates to an optical layered body, comprising: at least a low refractive index layer on a light-transmitting substrate, wherein the low refractive index layer is formed by using a composition for a low refractive index layer, the composition comprising a hollow silica fine particle and an organic binder, the organic binder containing: a fluorine atom-free polyfunctional monomer having three or more reactive functional groups in one molecule; a fluorine atom-containing monomer; and a fluorine atom-containing polymer.

The fluorine atom-containing monomer is preferably a derivative of a fluorine atom-free polyfunctional monomer and a fluorine compound.

Preferably, the fluorine atom-containing monomer has two or more reactive functional groups in one molecule, and the fluorine atom-containing polymer has ten or more reactive functional groups in one molecule.

The fluorine atom-free polyfunctional monomer is preferably at least one monomer selected from the group consisting of pentaerythritol tri(meth)acrylate, dipentaerythritol hexa (meth)acrylate, pentaerythritol tetra(meth)acrylate, dipentaerythritol penta(meth)acrylate, trimethylolpropane tri(meth)acrylate, dipentaerythritol tetra(meth)acrylate, and isocyanuric acid EO-modified tri(meth)acrylate.

An amount (Fm) of the fluorine atom-containing monomer and an amount (Fp) of the fluorine atom-containing polymer in the organic binder are preferably represented by one of (1), (2) and (3) and fulfilled Fm+Fp<100% by mass:

(1) 40% by mass<Fp<99% by mass when 0% by mass<Fm≤5% by mass;

(2) 0% by mass<Fp≤20% by mass or 40% by mass<Fp<99% by mass when 5% by mass<Fm≤30% by mass;

(3) 0% by mass<Fp≤70% by mass when 30% by mass<Fm<99% by mass.

Preferably, the fluorine atom-containing monomer has a weight-average molecular weight of 500 or more and less than 10,000, and the fluorine atom-containing polymer has a weight-average molecular weight of 10,000 or more and 200,000 or less.

The fluorine atom-containing polymer preferably has a compound containing a silicon atom in a part of one molecule.

The composition for a low refractive index layer preferably contains silica fine particles having a reactive functional group on a surface in a ratio of 40% by mass or less with respect to 100% by mass of the total of the silica fine particles and the organic binder.

Preferably, the composition for a low refractive index layer contains an antifouling agent, and the antifouling agent contains a reactive functional group, a fluorine atom, and a silicon atom.

In the optical layered body of the present invention, the low refractive index layer preferably has a refractive index of less than 1.45.

In the optical layered body of the present invention, at least one layer selected from the group consisting of a hard coat layer, an antiglare layer, and an antistatic layer is preferably provided between the light-transmitting substrate and the low refractive index layer.

In the optical layered body of the present invention, an antifouling layer and/or an antistatic layer are preferably provided on the low refractive index layer.

The present invention also relates to a polarizer, comprising: a polarizing element, wherein said polarizer includes the above-mentioned optical layered body on a surface of the polarizing element.

The present invention also relates to an image display device, comprising: the above-mentioned optical layered body or the above-mentioned polarizer, on the outermost surface.

Hereinafter, the present invention will be described in detail.

DETAILED DESCRIPTION OF THE INVENTION

The present invention is an optical layered body having at least a low refractive index layer on a light-transmitting substrate.

In the optical layered body of the present invention, the low refractive index layer is formed by using a composition for a low refractive index layer that contains: a hollow silica fine particle; and an organic binder, which contains: a fluorine atom-free polyfunctional monomer having three or more reactive functional groups in one molecule; a fluorine atom-containing monomer; and a fluorine atom-containing polymer. The low refractive index layer formed by using the composition for a low refractive index layer having the above-mentioned composition has a refractive index lower than that of the conventional low refractive index layer that contains a hollow silica fine particle as a low refractive-index agent. Therefore, the optical layered body of the present invention has excellent antireflection properties.

Low Refractive Index Layer

The low refractive index layer has a refractive index lower than that of components other than a low refractive index layer, such as a light-transmitting substrate, which forms the optical layered body of the present invention.

In the optical layered body of the present invention, the low refractive index layer is formed by using a composition for a low refractive index layer, the composition comprising a hollow silica fine particle and an organic binder, the organic binder containing: a fluorine atom-free polyfunctional monomer, a fluorine atom-containing monomer, and a fluorine atom-containing polymer.

The hollow silica fine particle has the function of lowering the refractive index of the low refractive index layer while maintaining layer strength thereof. The "hollow silica fine particle" used herein refer to a silica fine particle having a structure in which the inside of the particles is filled with vapor and/or a porous structure including vapor, and a property that the refractive index decreases in proportion to a proportion in which the vapor makes up of the particle compared with the refractive index of original silica fine particle.

Further, in the present invention, the silica fine particle includes silica fine particle, in which a nano porous structure can be formed at least a part of the inside of a coat and/or the surface of a coat, based on the configuration, the structure and the agglomerated state of the silica fine particles and the dispersed state of the silica fine particles within the coat formed by using the composition for a low refractive index layer.

The hollow silica fine particles are not particularly limited, and specific preferable examples thereof include silica fine particles prepared by use of a technique disclosed in Japanese Kokai Publication 2001-233611. Since the silica fine particles are easily produced and have high particles' own hardness, their layer strength is improved and it is possible to reduce the refractive index when the silica fine particles are mixed with an organic binder and the resultant mixture was used to form a low refractive index layer.

Examples of the silica fine particle, in which a nano porous structure can be formed at least a part of the inside of the coat and/or the surface of the coat, include, in addition to the silica particles previously described, an absorbent produced and used for the purpose of increasing a specific surface area, in which various chemical substances are adsorbed on a column for filling and a porous portion of the surface, porous fine particles used for fixing a catalyst, or dispersed substances or agglomerated substances of hollow fine particles for the purpose of incorporating in a heat insulating material or a low dielectric material. Specific examples thereof include the aggregate of porous silica fine particles of commercially available Nipsil and Nipgel (trade names) produced by Nihon Silica Kogyo Co., Ltd., and colloidal silica UP series (trade name), having a structure in which silica particles are linked with one another in a chain form, produced by Nissan Chemical Industries, Ltd. It is possible to select and use the particles within the range of the preferable particle size of the present invention among these.

The average particle size of the hollow silica fine particles is preferably 5 to 300 nm. When the average particle size of the hollow silica fine particles is within the range, it is possible to impart excellent transparency to the low refractive index layer. A more preferable lower limit thereof is 8 nm, and a more preferable upper limit thereof is 100 nm. A further preferable lower limit thereof is 10 nm, and a further preferable upper limit thereof is 80 nm.

In the composition for a low refractive index layer, the amount of the hollow silica fine particles is not particularly limited, and is preferably 200 parts by mass or less with respect to 100 parts by mass of the below-mentioned organic binder component (solid content). When it exceeds 200 parts by mass, the strength of a low refractive index layer to be formed may be insufficient. A more preferable lower limit thereof is 10 parts by mass, and a more preferable upper limit thereof is 165 parts by mass.

The composition for a low refractive index layer contains an organic binder, which contains: a fluorine atom-free polyfunctional monomer having three or more reactive functional groups in one molecule; a fluorine atom-containing monomer; and a fluorine atom-containing polymer.

When the composition for a low refractive index layer contains an organic binder having the above-mentioned composition, it is possible to obtain a low refractive index layer that has a refractive index lower than that of the conventional low refractive index layer. It is because when a low refractive index layer to be formed contains hollow silica fine particles, they have a lower refractive index, and the organic binder contains a fluorine atom-containing monomer and a fluorine atom-containing polymer.

Here, problematically, the fluorine atom-containing polymer generally has a very bad compatibility with the fluorine atom-free polyfunctional monomer, phase separation easily occurs in the composition containing these, and whitening occurs in the film formed by using the composition. However, when the present invention contains a fluorine atom-containing monomer as the organic binder, the compatibility between the fluorine atom-containing polymer and the fluorine atom-free polyfunctional monomer can be improved by interposing the fluorine atom-containing monomer therebetween, and whitening can be prevented from occurring in a low refractive index layer to be formed. That is, although the optical layered body of the present invention contains, as an organic binder in the composition for a low refractive index layer, the fluorine atom-free polyfunctional monomer and the fluorine atom-containing polymer, which are less likely to be compatible with each other, it is possible to prevent phase separation between these substances.

In the organic binder, the fluorine atom-free polyfunctional monomer is not particularly limited as long as it does not contain a fluorine atom and has three or more reactive functional groups in one molecule. Examples of the fluorine atom-free polyfunctional monomer include, a monomer having, in one molecule, a functional group (hereinafter, also referred to as an ionizing radiation curable group) cured by ionizing radiation, and a functional group (hereinafter, also referred to as a thermosetting group) cured by heat.

A coat formed by using a composition for a low refractive index layer is irradiated with ionizing radiation when the fluorine atom-free polyfunctional monomer has the ionizing radiation curable group. Thereby, it is possible to proceed with a reaction for increasing molecular weights of polymers, such as polymerization or crosslinking, between the fluorine atom-free polyfunctional monomers and/or other components, and also to cure the coat.

Examples of the ionizing radiation curable group include an ionizing radiation curable group whose reaction proceeds through: polymerization reactions, such as optical radical polymerization, optical cationic polymerization, and optical anionic polymerization; or addition polymerization or polycondensation that progress through photodimerization. Ethylene unsaturated linking groups, such as an acrylic group, a vinyl group, and an allyl group, are subjected to an optical radical polymerization reaction, directly by the irradiation of ionizing radiation, such as ultraviolet rays and electron beams, or indirectly by being subjected to an initiator. Thus, Ethylene unsaturated linking groups are preferable because of its comparative easiness in handling including photo-setting.

When the fluorine atom-free polyfunctional monomer has the thermosetting group, by heating the coat formed by using the composition for a low refractive index layer, it is possible to proceed with a reaction for increasing molecular weights of polymers, such as polymerization or crosslinking, between the fluorine atom-free polyfunctional monomers and/or other components, and also to cure the coat.

Examples of the thermosetting group include an alkoxy group, a hydroxy group, a carboxyl group, an amino group, an epoxy group, and the like. A functional group (a hydrogen bonding group) that can form a hydrogen bond is preferable among these. The hydrogen bonding group is excellent in its compatibility with a hydroxy group on the surface of the hollow silica fine particles, and the hydrogen bonding group improves the dispersibility of the hollow silica fine particles and the aggregate of the fine particles in the composition for a low refractive index layer; therefore, it is preferable.

The hydrogen bonding group is particularly preferably a hydroxy group. The storage stability of the composition for a low refractive index layer is excellent, and thermosetting of the coat leads to formation of a covalent bond with the hydroxy group present on the surface of the hollow silica fine particles, the hollow silica fine particles act as a crosslinking agent, and it is possible to further improve film strength thereof.

The fluorine atom-free polyfunctional monomer has three or more reactive functional groups in one molecule. The fluorine atom-free monomer having three or more reactive functional groups in one molecule is easily crosslinked by external stimuli such as the irradiation of ionizing radiation and heating in the coat of the composition for a low refractive index layer. Thereby, it is possible to efficiently cure the coat and obtain a low refractive index layer having excellent hardness. The fluorine atom-free polyfunctional monomer having three or more (meth)acrylic groups in one molecule is suitably used. The (meth)acrylic group used herein refers to an acrylic group or a methacrylic group.

Examples of the fluorine atom-free polyfunctional monomer having three or more (meth)acrylic groups in, one molecule include pentaerythritol tri(meth)acrylate, dipentaerythritol hexa(meth)acrylate, pentaerythritol tetra(meth)acrylate, dipentaerythritol penta(meth)acrylate, trimethylolpropane tri(meth)acrylate, dipentaerythritol tetra(meth)acrylate, isocyanuric acid EO-modified tri(meth)acrylate, and the like. These (meth)acrylates may be one of which a part of a molecular structure is modified, and a (meth)acrylate compound modified with ethylene oxide, propylene oxide, caprolactone, isocyanuric acid, alkyl, cyclic alkyl, aromatic, or bisphenol can also be used. These fluorine atom-free polyfunctional monomers may be used independently, or two or more kinds thereof may be used in combination. These fluorine atom-free polyfunctional monomers are in the below-mentioned range of the refractive index and excellent in cure reaction, and it is possible to improve the hardness of a low refractive index layer to be obtained.

The refractive index of the fluorine atom-free polyfunctional monomer is preferably 1.47 to 1.53. It is practically impossible to allow the refractive index to be less than 1.47. When it exceeds 1.53, the low refractive index layer having a sufficiently low refractive index may not be obtained. The refractive index used herein refers to a refractive index of a cured material, and the refractive index used in the following explanation is also the same meaning.

The weight-average molecular weight of the fluorine atom-free polyfunctional monomer is preferably 250 to 1000. When it is less than 250, since the number of functional groups is small, the hardness of a low refractive index layer to be obtained may be deteriorated. When it exceeds 1000, since the functional group equivalent amount (the number of functional groups/molecular weight) is small, crosslinking density is lowered and the low refractive index layer having sufficient hardness may not be obtained.

It is to be noted that the weight-average molecular weight of the fluorine atom-free polyfunctional monomer can be calculated as a polystyrene equivalent molecular weight using a value obtained by gel permeation chromatography (GPC). Tetrahydrofuran and chloroform can be used as a solvent of the GPC mobile phase. Columns for measurement may be used by combining commercially available columns for tetrahydrofuran or for chloroform. Examples of the commercially available columns include Shodex GPC KF-801, and GPC-KF800D (trade names, all produced by Showa Denko K.K.). An RI (differential refractive index) detector and a UV detector may be used as detectors. By using such a solvent, a column, and a detector, the weight average molecular weight can be measured appropriately, for example, by GPC systems such as Shodex GPC-101 (produced by Showa Denko K.K.).

The content of the fluorine atom-free polyfunctional monomer is preferably 5 to 50% by mass or higher with respect to 100% by mass of the organic binder. When it is less than 5% by mass, the hardness of a low refractive index layer to be formed may be insufficient, and the surface coated with the composition for a low refractive index layer may be deteriorated, likely leading to cissing. When it exceeds 50% by mass, the refractive index of a low refractive index layer to be formed does not decrease, and the optical layered body having the target low reflection may not be obtained. A more preferable lower limit thereof is 10% by mass, and a more preferable upper limit thereof is 30% by mass.

The fluorine atom-containing monomer and the fluorine atom-containing polymer are an organic binder in the composition for a low refractive index layer, and also a substance that has the function of reducing the refractive index of a low refractive index layer to be formed.

The fluorine atom-containing monomer preferably has two or more reactive functional groups in one molecule. The fluorine atom-containing monomer having two or more reactive functional groups in one molecule is easily crosslinked by external stimuli such as ionizing irradiation and heating in the coat of the composition for a low refractive index layer, and it is possible to efficiently cure the coat and obtain a low refractive index layer having excellent hardness.

As the fluorine atom-containing monomer, a derivative of a fluorine atom-free polyfunctional monomer and a fluorine compound is suitably used. The fluorine atom-containing monomer has excellent compatibility with the fluorine atom-free polyfunctional monomer. Thus, it is possible to very efficiently prevent phase separation of the organic binder and suitably prevent whitening in a low refractive index layer to be formed.

Specific examples of the fluorine atom-containing monomer that can be suitably used include a fluorine atom-containing monomer having a pentaerythritol skeleton, a fluorine atom-containing monomer having a dipentaerythritol skeleton, a fluorine atom-containing monomer having a trimethylolpropane skeleton, a fluorine atom-containing monomer having a cyclohexyl skeleton, a fluorine atom-containing monomer having a straight chain skeleton, and the like.

There may be mentioned at least one kind of compound selected from the group consisting of the following chemical formulae (1), (2), (3) and (4) as the fluorine atom-containing monomer having a pentaerythritol skeleton.

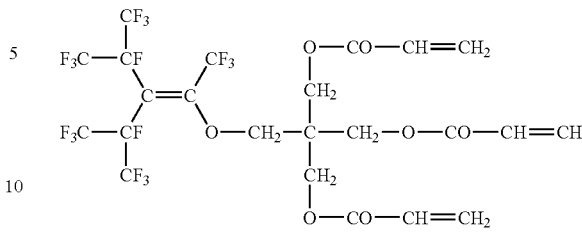

(1)

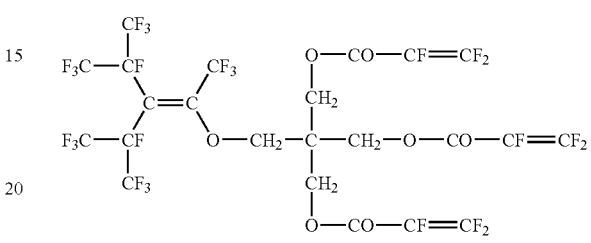

(2)

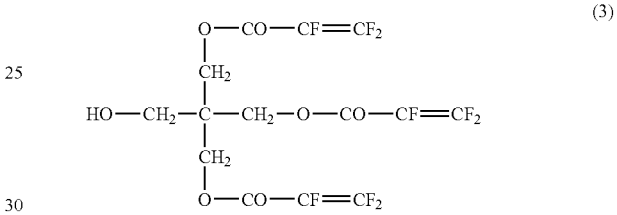

(3)

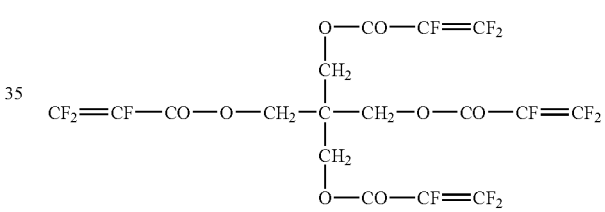

(4)

There may be mentioned at least one kind of compound selected from the group consisting of the following chemical formulae (5), (6), (7), and (8) as the fluorine atom-containing monomer having a dipentaerythritol skeleton.

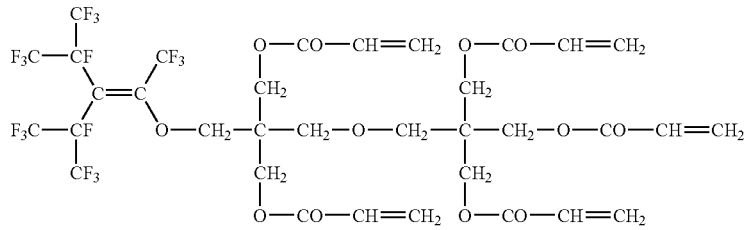

(5)

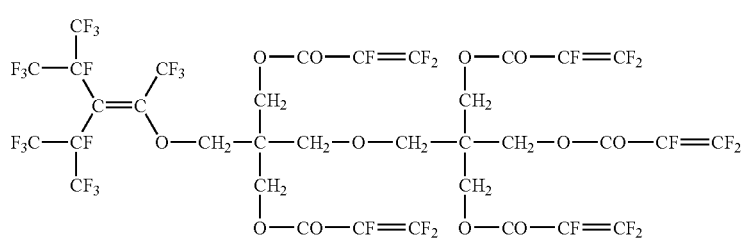

(6)

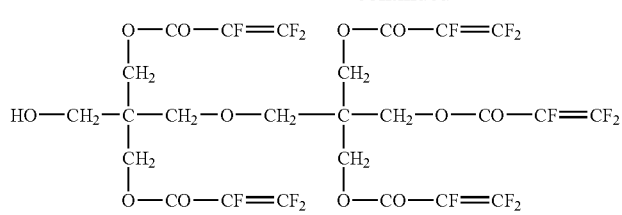
(7)

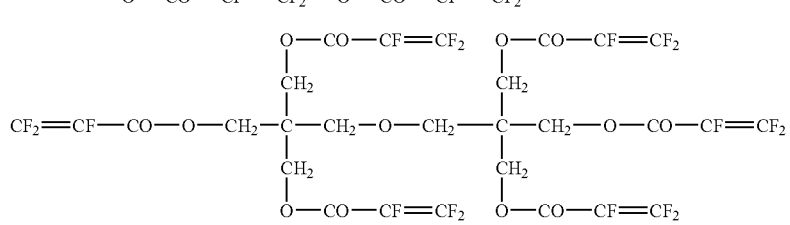
(8)

There may be mentioned a compound having a structure represented by the following chemical formula (9) or (10) as the fluorine atom-containing monomer having a trimethylolpropane skeleton.

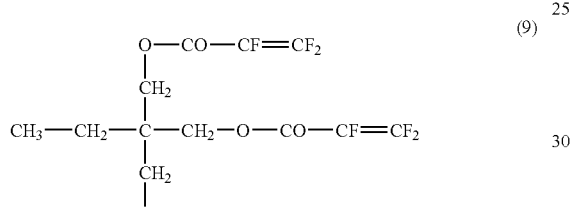
(9)

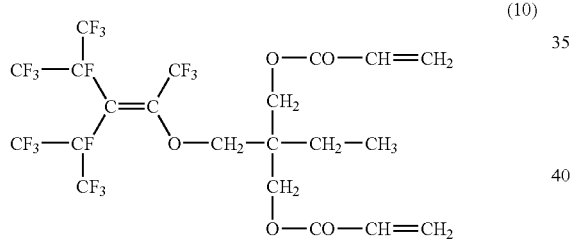
(10)

There may be mentioned at least one kind of compound selected from the group consisting of the following chemical formulae (11), (12), (13), (14), (15), (16), (17) and (18) as the fluorine atom-containing monomer having a cyclohexyl skeleton.

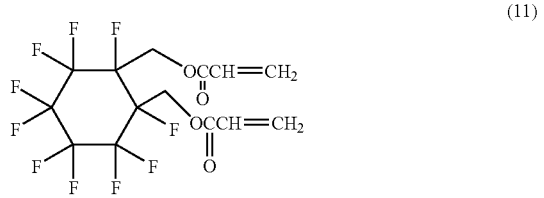
(11)

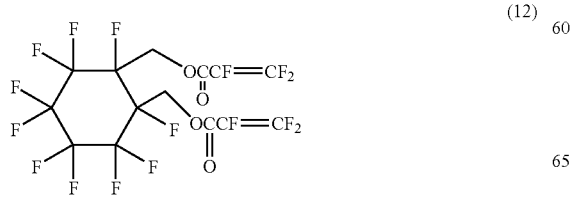
(12)

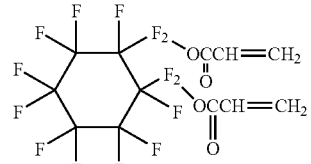
(13)

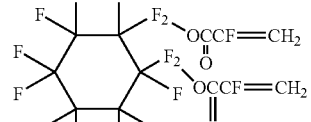
(14)

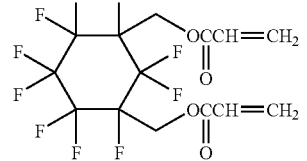
(15)

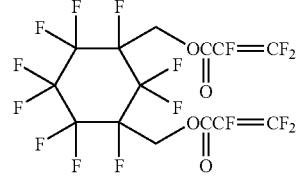
(16)

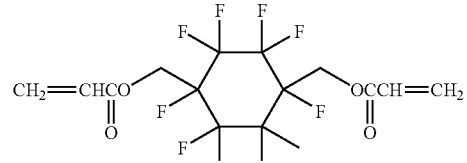
(17)

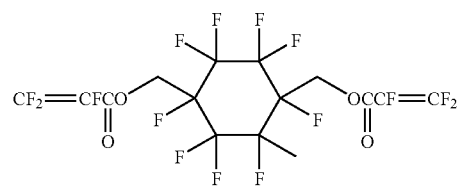
(18)

There may be mentioned a compound having a structure represented by the following chemical formula (19) as the fluorine atom-containing monomer having a straight chain skeleton.

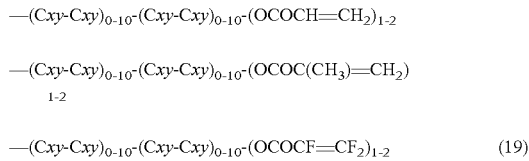

—(Cxy-Cxy)$_{0-10}$-(Cxy-Cxy)$_{0-10}$-(OCOCF=CF$_2$)$_{1-2}$ (19)

In the formula (19), x represent F, and y represents (CF$_2$)$_{0-10}$CF$_3$.

Examples of the fluorine atom-containing monomer having a straight chain skeleton include Fluorolink MD 700, 5105X, 5110X, 5101X, 5113X, and the like, all produced by Solvay Solexis K.K.

In the optical layered body of the present invention, a compound having a pentaerythritol skeleton is preferable as the fluorine atom-containing monomer. A compound having a structure represented by the chemical formula (1) is suitably used in terms of excellent scratch resistance, refractive index, and haze of a low refractive index layer to be formed, and excellent coating of the composition for a low refractive index layer.

The refractive index of the fluorine atom-containing monomer is preferably 1.35 to 1.43. When it is less than 1.35, the fluorine atom-containing monomer may be dissolved in only a special solvent. When it exceeds 1.43, it may be impossible to reduce the refractive index of a low refractive index layer to be formed to the desired range.

The weight average molecular weight of the fluorine atom-containing monomer is preferably 500 or more, and less than 10,000. When it is less than 500, the number of functional groups is small; thus, it is not preferable. When it is 10,000 or more, the compatibility of the fluorine atom-containing monomer with the fluorine atom-free polyfunctional monomer is deteriorated, phase separation occurs in the composition for a low refractive index layer, and whitening may occur in the low refractive index layer to be formed. A more preferable lower limit thereof is 700, and a more preferable upper limit thereof is 5000.

The weight-average molecular weight of the fluorine atom-containing monomer can be calculated as a polystyrene equivalent molecular weight using a value obtained by gel permeation chromatography (GPC). Tetrahydrofuran and chloroform can be used as a solvent of the GPC mobile phase. Columns for measurement may be used by combining commercially available columns for tetrahydrofuran or for chloroform. Examples of the commercially available columns include Shodex GPC KF-801, GPC KF-802, GPC KF-803, GPC KF-804, GPC KF-805 and GPC-KF800D (trade names, all produced by Showa Denko K.K.). An RI (differential refractive index) detector and a UV detector may be used as detectors. By using such a solvent, a column, and a detector, the weight average molecular weight can be measured appropriately, for example, by GPC systems such as Shodex GPC-101 (produced by Showa Denko K.K.).

The fluorine atom-containing polymer is not particularly limited, and examples thereof include partially and fully fluorinated alkyl, alkenyl, or aryl esters of acrylic acid or methacrylic acid, fully or partially fluorinated vinyl ethers, fully or partially fluorinated vinyl esters, fully or partially fluorinated vinyl ketones, and the like.

Further, examples of the fluorine atom-containing polymer include: polymers of a monomer or a mixture of monomers, containing at least one kind of fluorine-containing (meth) acrylate compound of the polymerizable compounds having the ionizing radiation-curable group; copolymers of at least one of the fluorine-containing (meth)acrylate compound and a (meth)acrylate compound not containing a fluorine atom in a molecule such as methyl (meth)acrylate, ethyl (meth)acrylate, propyl(meth)acrylate, butyl(meth)acrylate and 2-ethylhexyl (meth)acrylate; and monopolymers or copolymers of fluorine-containing monomers such as fluoroethylene, vinylidene fluoride, trifluoroethylene, chloro-trifluoroethylene, 3,3,3-trifluoropropylene, 1,1,2-trichloro-3,3,3-trifluoropropylene and hexafluoropropylene.

The fluorine atom-containing polymer preferably has a compound containing a silicon atom in a part of one molecule. When the fluorine atom-containing polymer has the compound containing a silicon atom, slip property of a low refractive index layer to be formed is improved, leading to enhancement of scratch resistance. Even when pollutants, such as fingerprints, oil, and dust, are attached to the low refractive index layer, it is possible to easily wipe off the pollutants. Since the silicon atom is in the molecule of the fluorine atom-containing polymer, it does not drop, and it is possible to maintain each of the above-mentioned performances.

It is to be noted that when the fluorine atom-containing polymer (a polymer compound that does not have a silicon atom) containing a fluorine atom in one molecule is mixed with a silicon atom-containing polymer (a polymer compound that does not have a fluorine atom) having silicon in one molecule, they are not mixed well and are separated (separated and repelled especially during drying), resulting in contamination of a coated film. That is, since they are separated and have a sea-island structure and repelled, an optical layered body to be obtained looks white (haze deterioration), and scratch resistance are deteriorated; thus, as described above, the fluorine atom-containing polymer containing a silicon atom in a part of one molecule is preferable.

Further, since the fluorine atom-containing polymer has a compound containing a silicon atom in a part of one molecule, when the optical layered body of the present invention is wound in a roll, the compound containing a silicon atom does not move to the back of the optical layered body.

Examples of the fluorine atom-containing polymer that has a compound containing a silicon atom in a part of one molecule include: a silicone-containing vinylidene fluoride copolymer containing a silicone component in a copolymer.

Examples of the silicone component in this case include (poly)dimethylsiloxane, (poly)diethylsiloxane, (poly)diphenylsiloxane, (poly)methylphenylsiloxane, alkyl-modified (poly)dimethylsiloxane, azo group-containing (poly)dimethylsiloxane, dimethylsilicone, phenylmethylsilicone, alkyl/aralkyl-modified silicone, fluorosilicone, polyether-modified silicone, fatty acid ester-modified silicone, methyl hydrogenated silicone, silanol group-containing silicone, alkoxyl group-containing silicone, phenol group-containing silicone, methacryl-modified silicone, acryl modified silicone, amino-modified silicone, carboxylic acid-modified silicone, carbinol-modified silicone, epoxy-modified silicone, mercapto-modified silicone, fluoro-modified silicone, polyether-modified silicone, and the like. Among them, those having a dimethylsiloxane structure are preferable.

Furthermore, utilizable as a fluorine atom-containing polymer, in addition to the above-mentioned material, are compounds obtained by reacting a fluorine-containing compound having at least one isocyanato group in a molecule with a compound having at least one functional group, such as an amino group, a hydroxyl group or a carboxyl group, which reacts with an isocyanato group, in a molecule; and compounds obtained by reacting fluorine-containing polyol such as fluorine-containing polyether polyols, fluorine-containing alkyl polyols, fluorine-containing polyester polyols or fluorine-containing ε-caprolactone modified polyols with a compound having an isocyanato group.

Commercial products can also be used as the fluorine atom-containing polymer. Examples of the commercial products of the fluorine atom-containing polymer that can be used in the optical layered body of the present invention include: Opster TU2181-6, Opster TU2181-7, Opster TU2202, Opster JN35, and Opster TU2224, all produced by JSR Corp.; Optool AR110, Optool AR100, and Optool DAC, all produced by Daikin Industries, Ltd.; and the like.

The refractive index of the fluorine atom-containing polymer is preferably 1.37 to 1.43. When it is less than 1.37, solubility thereof is deteriorated, it is less likely to be dissolved in a solvent, and handling thereof may be difficult. When it exceeds 1.43, the refractive index of a low refractive index layer to be formed may not be reduced to the desired range.

The weight-average molecular weight of the fluorine atom-containing polymer is preferably 10,000 or more, and 200,000 or less. When it is less than 10,000, the film-forming property of the composition for a low refractive index layer may be reduced. When it exceeds 200,000, phase separation is more likely to occur in the organic binder, and whitening may occur in a low refractive index layer to be formed. A more preferable lower limit thereof is 15,000, and a more preferable upper limit thereof is 50,000.

It is to be noted the weight-average molecular weight of the fluorine atom-containing polymer can be calculated as a polystyrene equivalent molecular weight using a value obtained by gel permeation chromatography (GPC) in the same manner as in the above-mentioned fluorine atom-containing monomer. As a measuring column, columns for tetrahydrofuran may be used. Examples thereof include Shodex GPC KF-802, GPC KF-803, GPC KF-804, GPC KF-805, GPC KF-806, GPC-KF 800D (trade names, all produced by Showa Denko K.K.), and the like.

In the optical layered body of the present invention, an amount (Fm) of the fluorine atom-containing monomer and an amount (Fp) of the fluorine atom-containing polymer in the organic binder are represented by one of (1), (2) and (3) and fulfilled $Fm+Fp<100\%$ by mass.

(1) $40\%$ by $mass<Fp<99\%$ by mass when $0\%$ by $mass<Fm\leq5\%$ by mass;

(2) $0\%$ by $mass<Fp\leq20\%$ by mass or $40\%$ by $mass<Fp<99\%$ by mass when $5\%$ by $mass<Fm\leq30\%$ by mass;

(3) $0\%$ by $mass<Fp\leq70\%$ by mass when $30\%$ by $mass<Fm<99\%$ by mass.

When the amount (Fm) of the fluorine atom-containing monomer and the amount (Fp) of the fluorine atom-containing polymer in the organic binder are represented by one of (1) to (3), a low refractive index layer to be obtained has excellent property such as a low refractive index, a high hardness, and surface evenness, and it is possible to prevent phase separation of the organic binder and whitening in the low refractive index layer. As a result, the optical layered body of the present invention has excellent scratch resistance and antireflection properties, and also excels in optical properties such as transparency.

When the amount (Fp) of the fluorine atom-containing polymer is $40\%$ by mass or less in (1), phase separation occurs in the organic binder, and a low refractive index layer to be obtained whitens. Particularly when the amount (Fp) of the fluorine atom-containing polymer is $20\%$ by mass or less, it is impossible to sufficiently reduce the refractive index of a low refractive index layer to be obtained. When the amount (Fp) of the fluorine atom-containing polymer is $99\%$ by mass or more, the hardness of a low refractive index layer to be obtained is insufficient.

When the amount (Fp) of the fluorine atom-containing polymer is $20\%$ by $mass<Fp\leq40\%$ by mass in (2), phase separation occurs in the organic binder, and a low refractive index layer to be obtained whitens. When the amount (Fp) of the fluorine atom-containing polymer is $99\%$ by mass or more, the hardness of a low refractive index layer to be obtained is insufficient.

When the amount (Fm) of the fluorine atom-containing monomer is $99\%$ by mass or more in (3), the wettability of the composition for a low refractive index layer to an object to be coated is deteriorated, and the coated surface is uneven.

Since the optical layered body of the present invention contains an organic binder having the above-mentioned composition in the composition for a low refractive index layer, a low refractive index layer to be obtained excels in hardness and surface evenness and has a sufficiently low refractive index.

As particularly preferable combinations of the compositions of the organic binder in the optical layered body of the present invention, there may be mentioned the following combinations.

(a) Combination Containing:
a fluorine atom-free polyfunctional monomer: pentaerythritol triacrylate;
a fluorine atom-containing monomer: LINC3A (compound having a structure represented by the chemical formula (1)) produced by Kyoeisha Chemical Co., Ltd.; and
a fluorine atom-containing polymer: Opster JN35 produced by JSR Corp.

(b) Combination Containing:
a fluorine atom-free polyfunctional monomer: pentaerythritol triacrylate;
a fluorine atom-containing monomer: LINC3A (compound having a structure represented by the chemical formula (1)) produced by Kyoeisha Chemical Co., Ltd.; and
a fluorine atom-containing polymer: Optool AR110 produced by Daikin Industries, Ltd.

(c) Combination Containing:
a fluorine atom-free polyfunctional monomer: pentaerythritol triacrylate;
a fluorine atom-containing monomer: LINC102A (compound having a structure represented by the chemical formula (11)) produced by Kyoeisha Chemical Co., Ltd.; and
a fluorine atom-containing polymer: Optool AR110 produced by Daikin Industries, Ltd.

(d) Combination Containing:
a fluorine atom-free polyfunctional monomer: pentaerythritol triacrylate;
a fluorine atom-containing monomer: LINC3A (compound having a structure represented by the chemical formula (1)) produced by Kyoeisha Chemical Co., Ltd.; and
a fluorine atom-containing polymer: a fluorine resin produced by JSR Corp. (Opster JN35 improved product, refractive index: 1.42, weight-average molecular weight: 15000)

(e) Combination Containing:
a fluorine atom-free polyfunctional monomer: dipentaerythritol hexaacrylate;
a fluorine atom-containing monomer: LINC3A (compound having a structure represented by the chemical formula (1)) produced by Kyoeisha Chemical Co., Ltd.; and
a fluorine atom-containing polymer: Opster JN35 produced by JSR Corp.

(f) Combination Containing:
  a fluorine atom-free polyfunctional monomer: pentaerythritol triacrylate;
  a fluorine atom-containing monomer: LINC3A (compound having a structure represented by the chemical formula (1)) produced by Kyoeisha Chemical Co., Ltd.; and
  a fluorine atom-containing polymer: Opster TU2224 produced by JSR Corp., (g) Combination Containing:
  a fluorine atom-free polyfunctional monomer: pentaerythritol triacrylate;
  a fluorine atom-containing monomer: NK Ester DAF3EO (compound having a structure represented by the chemical formula (19)) produced by Shin-Nakamura Chemical Co., Ltd.; and
  a fluorine atom-containing polymer: Opster TU2224 produced by JSR Corp., (h) Combination Containing:
  a fluorine atom-free polyfunctional monomer: pentaerythritol triacrylate;
  a fluorine atom-containing monomer: LINC102A (compound having a structure represented by the chemical formula (11)) produced by Kyoeisha Chemical Co., Ltd.; and
  a fluorine atom-containing polymer: Opster JN35 produced by JSR Corp.

Preferable among these are (a), (d), and (f) in terms of a surface coated with the composition for a low refractive index layer, scratch resistance and a low refractive index of a low refractive index layer to be formed, and the like.

When the organic binder has the above-mentioned composition, it has excellent hardness and surface evenness and it is possible to obtain a low refractive index layer having a sufficiently low refractive index. The optical layered body of the present invention is excellent in scratch resistance and antireflection properties, and it can sufficiently achieve the high display quality required of an image display device in recent years.

When the amount of the fluorine atom-containing monomer and the fluorine atom-containing polymer in the organic binder is adjusted so as to satisfy any of (1) to (3) as described above, it is possible to suitably prevent whitening from occurring in the low refractive index layer, and the optical layered body of the present invention has excellent optical properties such as transparency as well as excellent antireflection properties.

The composition for a low refractive index layer may further contain a solvent.

The solvent is not particularly limited, and examples thereof include: alcohols, such as methanol, ethanol, propanol, isopropanol, n-butanol, s-butanol, t-butanol, benzyl alcohol, and PGME; ketones, such as acetone, methyl ethyl ketone, methyl isobutyl ketone, cyclohexanone, heptanone, diisobutyl ketone, and diethyl ketone; esters, such as methyl acetate, ethyl acetate, propyl acetate, butyl acetate, methyl formate, ethyl formate, propyl formate, butyl formate, and PGMEA; aliphatic hydrocarbons, such as hexane and cyclohexane; halogenated hydrocarbons, such as methylene chloride, chloroform, and carbon tetrachloride; aromatic hydrocarbons, such as benzene, toluene, and xylene; amides, such as dimethylformamide, dimethylacetamide, and n-methylpyrrolidone; ethers, such as diethylether, dioxane, and tetrahydrofuran; ether alcohols, such as 1-methoxy-2-propanol; and the like. Preferable among these are methyl isobutyl ketone, methyl ethyl ketone, isopropyl alcohol (IPA), n-butanol, s-butanol, t-butanol, PGME, and PGMEA.

The composition for a low refractive index layer preferably contains silica fine particles (hereinafter, also referred to as reactive silica fine particles) having a reactive functional group on its surface. The hardness of a low refractive index layer to be formed can be raised when the composition contains the reactive silica fine particles.

The reactive functional group means a functional group reactable with the above-mentioned organic binder. When having the reactive functional group on its surface, the reactive silica fine particles do not drop even if the low refractive index layer formed is scratched.

Specific examples of the reactive silica fine particles include: MIBK-SD (primary average particle size: 12 nm), MIBK-SDMS (primary average particle size: 20 nm), and MIBK-SDUP (primary average particle size: 9 to 15 nm, chain), all produced by Nissan Chemical Industries, Ltd.; ELCOM DP1116SIV (primary average particle size: 12 nm), ELCOM DP1129SIV (primary average particle size: 7 nm), ELCOM DP1061SIV (primary average particle size: 12 nm), ELCOM DP1050SIV (primary average particle size: 12 nm, fluorine coat), ELCOM DP1037SIV (primary average particle size: 12 nm), and ELCOM DP1026SIV (primary average particle size: 12 nm, alumina coat), all produced by JGC Catalysts and Chemicals Ltd.; Beam Set LB1 (primary average particle size: 20 nm), Beam Set 904 (primary average particle size: 20 nm), and Beam Set 907 (primary average particle size: 20 nm), all produced by Arakawa Chemical Industries, Ltd.; and the like. Preferable among these are: MIBK-SD (primary average particle size: 12 nm) produced by Nissan Chemical Industries, Ltd.; and ELCOM DP1129SIV (primary average particle size: 7 nm), ELCOM DP1050SIV (primary average particle size: 12 nm, fluorine coat), ELCOM DP1026SIV (primary average particle size: 12 nm, alumina coat), and ELCOM DP1116SIV (primary average particle size: 12 nm), all produced by JGC Catalysts and Chemicals Ltd.

A part of the outermost surface of the reactive silica fine particles is preferably coated with an organic compound containing a fluorine atom. When the part of the outermost surface is coated with the organic compound containing a fluorine atom, the refractive index of a low refractive index layer to be formed is reduced, and simultaneously, it is possible to improve antifouling property.

Examples of the fluorine atom-containing compound include a fluorine atom-containing silane coupling agent, the above-mentioned fluorine atom-containing monomer, and the like.

Also the reactive silica fine particles the part of the outermost surface of which is coated with the fluorine atom-containing organic compound can be produced by reacting the above-mentioned reactive silica fine particles with the fluorine atom-containing silane coupling agent.

Specific examples of the reactive silica fine particles the part of the outermost surface of which is coated with the fluorine atom-containing organic compound include: ELCOM DP1050SIV (primary average particle size: 12 nm, fluorine coat) produced by JGC Catalysts and Chemicals Ltd.; and the like. The reactive silica fine particles the part of the outermost surface of which is coated with the fluorine atom-containing organic compound is excellent in its compatibility with the fluorine atom-containing monomer and fluorine atom-containing polymer, and it is possible to prevent agglomerate, thus, it is preferable.

The average particle size of the reactive silica fine particles is preferably 1 to 20 nm. When it is less than 1 nm, the reactive silica fine particles are more likely to be agglomerated, the stability of the composition for a low refractive index layer itself may be problematic. The coated film itself exhibits poor appearance, the haze of a low refractive index layer to be formed rises, and especially irregularities of the aggregate may deteriorate scratch resistance.

The reactive silica fine particles exert the above-mentioned effect by filling gaps between particles of the above-mentioned hollow silica fine particles in the low refractive index layer. For this reason, when the average particle size of the reactive silica fine particles exceeds 20 nm, it may be impossible to fill the gaps between particles of the hollow silica fine particles, and the surface of a low refractive index layer to be formed may be uneven; thus, scratch resistance may be deteriorated. A more preferable lower limit of the average particle size is 6 nm, and a more preferable upper limit thereof is 13 nm.

Since the gaps between particles increase in number by lowering the proportion of the hollow silica fine particles, it is possible to fill the gaps between particles even when the average particle size of the reactive silica fine particles exceeds 20 nm. However, since the refractive index of the hollow silica fine particles is lower than that of the reactive silica fine particles though both the hollow silica fine particles and the reactive silica fine particles are silica fine particles, it is impossible to produce an optical layered body with low reflection upon lowering the proportion of the hollow silica fine particles.

The reactive silica fine particles are preferably hollow or porous. When the composition for a low refractive index layer contains hollow or porous reactive silica fine particles, it is possible to further improve the hardness of a low refractive index layer to be formed and reduce the refractive index in a suitable manner.

The composition for a low refractive index layer preferably contains reactive silica fine particles in a ratio of 40% by mass or less with respect to 100% by mass of the total of the reactive silica fine particles and the organic binder. When it exceeds 40% by mass, the refractive index of a low refractive index layer to be formed may not be sufficiently reduced. A more preferable upper limit thereof is 30% by mass.

The composition for a low refractive index layer preferably contains an antifouling agent.

When the composition for a low refractive index layer contains the antifouling agent, antifouling performance can be provided to a low refractive index layer to be formed.

The antifouling agent preferably contains a reactive functional group, a fluorine atom, and a silicon atom. When the composition for a low refractive index layer contains the antifouling agent, it is possible to further improve the antifouling performance of a low refractive index layer to be formed.

Since the antifouling agent containing a reactive functional group, a fluorine atom, and a silicon atom has a silicon atom, slip property of a low refractive index layer to be formed improves, leading to enhancement of scratch resistance. Even when pollutants, such as fingerprints, oil, and dust, are attached to the low refractive index layer, it is possible to easily wipe off the pollutants; thus, the antifouling agent is preferable.

When the antifouling agent has the reactive functional group, since it does not drop out of the formed low refractive index layer, the above-mentioned performances (scratch resistance and wiping properties) can be maintained. When the optical layered body of the present invention is wound in a roll, the antifouling agent does not move to the back of the optical layered body. Even when a protective film is stuck on the surface of the low refractive index layer, the antifouling agent does not move to the protective film.

When the antifouling agent has the fluorine atom, fingerprints and oil are less likely to be attached to the formed low refractive index layer. Even when fingerprints, etc. are attached to the low refractive index layer, it is possible to wipe them off easily.

The amount of the antifouling agent is preferably 1 to 10%, and more preferably 2 to 8%, in a mass ratio, with respect to the total solid content (hollow silica fine particles+an organic binder+reactive silica fine particles). When it is less than 1%, the antifouling performance of the optical layered body of the present invention may be insufficient. Even when it exceeds 10%, it is impossible to further improve antifouling performance of the optical layered body of the present invention, likely resulting in deterioration of reflectance and degradation of the surface coated with the composition for a low refractive index layer. Further, bubbles in the composition for a low refractive index layer often increase, which may cause degradation of the coated surface and quality deterioration of a low refractive index layer to be obtained (increase in bubble defects).

The composition for a low refractive index layer may contain other components if necessary.

Examples of the other components include a photopolymerization initiator, a leveling agent, a crosslinking agent, a curing agent, a polymerization accelerator, a viscosity adjustment agent, an antiglare agent, an antistatic agent, and resins other than the above-mentioned resins.

When the composition for a low refractive index layer contains a resin having a radical polymerizable unsaturated group, examples of the photopolymerization initiator include acetophenones (for example, 1-hydroxy-cyclohexyl-phenyl-ketone commercially available as Irgacure 184 (trade name, produced by Ciba Specialty Chemicals Inc.)), benzophenones, thioxanthones, benzoin, benzoin methyl ether, and the like. These may be used independently or two or more kinds thereof may be used in combination.

When the composition for a low refractive index layer contains the resin having a cationic polymerizable functional group, examples of the photopolymerization initiator include an aromatic diazonium salt, an aromatic sulfonium salt, an aromatic iodonium salt, a metallocene compound, a benzoin sulfonic ester, and the like. These may be used independently or two or more kinds thereof may be used in combination. Specific examples thereof include: Irgacure 184, Irgacure 907, Irgacure 369, Irgacure 379, Irgacure 819, Irgacure 127, Irgacure 500, Irgacure 754, Irgacure 250, Irgacure 1800, Irgacure 1870, Irgacure OXE01, DAROCUR TPO, and DAROCUR1173, all produced by Ciba Specialty Chemicals Inc.; SpeedcureMBB, SpeedcurePBZ, SpeedcureITX, SpeedcureCTX, SpeedcureEDB, Esacure ONE, Esacure KIP150, Esacure KTO46, all produced by DKSH Japan; KAYACURE DETX-S, KAYACURE CTX, KAYACURE BMS, and KAYACURE DMBI, all produced by Nippon Kayaku Co., Ltd.; and the like. Preferable among these are Irgacure 369, Irgacure 127, Irgacure 907, Esacure ONE, SpeedcureMBB, SpeedcurePBZ, and KAYACURE DETX-S.

The additive amount of the photopolymerization initiator is preferably 0.1 to 10 parts by mass with respect to 100 parts by mass of the solid content of the binder component.

Utilizable are the conventionally known leveling agent, crosslinking agent, curing agent, polymerization accelerator, viscosity adjustment agent, antiglare agent, antistatic agent, and other resins.

A method for preparing the composition for a low refractive index layer is not particularly limited, and the composition can be obtained by mixing the hollow silica fine particles, the fluorine atom-free polyfunctional monomer, the fluorine atom-containing monomer and the fluorine atom-containing polymer, a solvent, and components, such as a photopolymerization initiator to be added if necessary. Conventionally known methods such as a paint shaker and a bead mill may be used for mixing.

The low refractive index layer can be formed by drying a coat, if necessary, which is formed by applying the composition for a low refractive index layer on the below-mentioned hard coat layer or antiglare layer, and curing the coat by ionizing irradiation or heating.

A method for applying the composition for a low refractive index layer is not particularly limited, and examples thereof include various methods such as a spin coating method, a dip method, a spray method, a die coating method, a bar coat method, a roll coater method, a meniscus coater method, a flexo printing method, a screen printing method and a bead coater method.

In the optical layered body of the present invention, the low refractive index layer preferably has a refractive index of less than 1.45. When it is 1.45 or more, the antireflection property of the optical layered body of the present invention is insufficient, which may result in failure to support high-level display quality of the image display device in recent years. A more preferable upper limit thereof is 1.40, and the most preferably upper limit thereof is 1.37.

The thickness (nm) dA of the low refractive index layer is preferably represented by the following formula (I):

$$dA = m\lambda/(4nA) \quad (I)$$

(provided that nA represents a refractive index of the low refractive index layer, m represents a positive odd number and preferably represents 1, and λ is a wavelength and preferably a value in the range of 480 to 580 nm.)

The low refractive index layer preferably has a haze value of 1% or less. When the haze value exceeds 1%, the light transmittance of the optical layered body of the present invention may fall, and it may cause display quality deterioration of the image display device. The haze value is more preferably 0.5% or less. The haze value used herein refers to a value obtained in conformity with JIS K7361.

It is to be noted that the favorable haze value can be suitably achieved by adjusting the amount of the fluorine atom-containing monomer and the fluorine atom-containing polymer in the organic binder within the above-mentioned range.

The low refractive index layer preferably has a hardness of class H or higher, and more preferably has a hardness of class 2H or higher, the hardness being determined by the pencil hardness test according to JIS K5600-5-4 (1999). In the taper test according to JIS K5600-5-4 (1999), the less abrasion loss of the test piece before and after the test, the more preferable it is. There is preferably no scratch observed in a scratch resistance test in which the surface of the low refractive index layer is rubbed back and forth 10 times at a friction load of 300 g/cm$^2$ by using a steel wool of #0000.

Light-Transmitting Substrate

The optical layered body of the present invention has a light-transmitting substrate.

The light-transmitting substrate preferably has smoothness and heat resistance and excels in mechanical strength. Specific examples of the material for forming the light-transmitting substrate include thermoplastic resins such as polyester (polyethylene terephthalate and polyethylene naphthalate), cellulose triacetate, cellulose diacetate, cellulose acetate butylate, polyester, polyamide, polyimide, polyethersulfone, polysulfone, polypropylene, polymethylpentene, polyvinyl chloride, polyvinyl acetal, polyether ketone, polymethyl methacrylate, polycarbonate or polyurethane. Preferable examples thereof include polyester (polyethylene terephthalate and polyethylene naphthalate) and cellulose triacetate.

As the light-transmitting substrate, a substrate prepared by processing the thermoplastic resin into a film-like body rich in flexibility is preferably used, and plates of these thermoplastic resins may also be used or a plate-like body of glass plate may also be used in accordance with a mode of use requiring hardness.

As the light-transmitting substrate, an amorphous olefin polymer (Cyclo-Olefin-Polymer (COP)) film having an alicyclic structure may also be used. This is a substrate comprising a norbornene polymer, a monocyclic olefin polymer, a cyclic conjugated diene polymer, a vinyl alicyclic hydrocarbon polymer, or the like. Examples thereof include ZEONEX and ZEONOR (norbornene resin) produced by Nippon ZEON Corporation, SUMILITE FS-1700 produced by Sumitomo Bakelite Co., Ltd., ARTON (modified norbornene resin) produced by JSR Corporation, APEL (cyclo olefin copolymer) produced by Mitsui Chemicals, Inc., Topas (cyclo olefin copolymer) produced by Ticona, OPTOREZ OZ-1000 series (alicyclic acrylic resin) produced by Hitachi Chemicals Co., Ltd., and the like.

Further, FV series (low birefringent and low photoelastic coefficient film) produced by Asahi Kasei Chemicals Corporation are also preferable as a substrate substituting for the substrate of triacetyl cellulose.

The light-transmitting substrate preferably has a thickness of 20 to 300 μm, and a more preferable lower limit thereof is 30 μm, and a more preferable upper limit thereof is 200 μm. When the light-transmitting substrate is a plate-like body, it may have a thickness exceeding these ranges. In order to enhance the adhesion property, the light-transmitting substrate may be subjected to physical treatments such as corona discharge treatment and oxidation treatment, or may be coated with a coating composition such as anchoring agents or primers before forming the below-mentioned hard coat layer and the like on the light-transmitting substrate.

Hard Coat Layer and the Like

In the optical layered body of the present invention, at least one layer selected from the group consisting of a hard coat layer, an antiglare layer, and an antistatic layer is preferably provided between the light-transmitting substrate and the low refractive index layer.

The hard coat layer used herein refers to a layer exhibiting the hardness of class 2H or higher in the pencil hardness test specified by JIS K 5600-5-4 (1999). The hardness is more preferably class 3H or higher. The hard coat layer preferably has a thickness (at the time of curing) of 0.1 to 100 μm, and more preferably has a thickness of 0.8 to 20 μm.

The hard coat layer is not particularly limited, and there may be mentioned, for example, a hard coat layer formed by a composition for a hard coat layer containing resin and optional components.

As the resin, a transparent resin is suitably used, and specific examples thereof include: an ionizing radiation curable resin, a resin which is cured with ultraviolet rays or electron beams; a mixture of the ionizing radiation curable resin and a solvent drying resin (a resin in which a coat is formed by only evaporating a solvent previously added in order to adjust a solid content during the application of the resin); a thermosetting resin; and the like. The ionizing radiation curable resin is preferable among these.

Specific examples of the ionizing radiation curable resin include resins having acrylate functional groups. The resins having acrylate functional groups include origomers or prepolymers with a comparatively low molecular weight, such as (meth)acrylate of polyester resins, polyether resins, acrylic resins, epoxy resins, urethane resins, alkyd resins, spiroacetal resins, polybutadiene resins, polythiol-polyene resins, polyfunctional compounds such as a polyhydric alcohol; reactive diluents; and the like.

Inorganic fine particles, such as colloidal silica, reactive silica, and alumina, may be added to the composition for a hard coat layer for the purpose of achieving improvement in hardness, prevention of curling, and adjustment of interference fringe of a hard coat layer to be formed.

The particle size and particle blending of the inorganic fine particles are suitably adjusted depending on the target transmittance and haze. The shape of the inorganic fine particles is not particularly limited, and examples of the shape include a spherical shape, a spherical (hollow) shape, a spherical (porous) shape, an atypical shape, a needle shape, an amorphous shape, a pendant shape, a disk shape, a crenated shape, and the like.

When the ionizing radiation curable resin is used as an ultraviolet curable resin, it is preferable to employ a photopolymerization initiator.

Examples of the photopolymerization initiator include acetophenones, benzophenones, Michler's benzoylbenzoate, α-amyloxime ester, tetramethylthiuram monosulfide, thioxanthones, and the like.

Further, it is preferable to mix and use a photosensitizer, and specific examples of the photosensitizer include n-butylamine, triethylamine, poly-n-butyl phosphine, and the like.

There may be primarily mentioned a thermoplastic resin as the solvent drying resin that is mixed in the ionizing radiation curable resin and used. The thermoplastic resin is not particularly limited, and conventionally known ones may be used.

Addition of the solvent drying resin can prevent the defect of the coat on the coated surface effectively. According to the preferred mode of the present invention, in the case where the material of the light-transmitting substrate is a cellulose resin such as cellulose triacetate, preferable specific examples of the thermoplastic resin include cellulose resins, such as nitrocellulose, acetyl cellulose, cellulose acetate propionate, and ethyl hydroxyethyl cellulose.

Examples of the thermosetting resin include a phenol resin, a urea resin, a diallyl phthalate resin, a melanin resin, a guanamine resin, an unsaturated polyester resin, a polyurethane resin, an epoxy resin, an amino alkyd resin, a melamine urea cocondensated resin, a silicone resin, a polysiloxane resin, and the like.

Upon using the thermosetting resin, a crosslinking agent, a curing agent such as a polymerization initiator, a polymerization accelerator, a solvent, a viscosity adjustment agent, and the like may be further added, if necessary, to the thermosetting resin.

The hard coat layer can be formed by drying a coat, if necessary, which is formed by applying on the light-transmitting substrate the composition for a hard coat layer prepared by using each of the above-mentioned materials, and curing the composition by ionizing irradiation or heating. The method for preparing the composition for a hard coat layer and the method for forming the coat include the same methods as those described regarding the low refractive index layer.

In the optical layered body of the present invention, one layer of the hard coat layer may be provided, or two or more layers thereof having the same or different composition may be provided.

Optional components (for example, a high refractive index agent, an antistatic agent, etc., which are commonly known fine particles or organic compounds) contained in the hard coat layer may be evenly dispersed, or the optional components may be unevenly distributed (for example, the optional components may exist in such a manner that the concentration thereof changes by gradation from the upper part to the lower part).

Particularly when the optional components may exist in such a manner that the concentration thereof decreases by gradation from the upper part to the lower part, performances of the optical layered body itself (for example, reflectance, antistatic performances, interference fringe, etc.) is often favorable. In this case, the optical layered body is often favorable also in terms of its cost.

Here, in the case where the optional components are unevenly distributed in the hard coat layer, the optional components may exist in such a manner that the concentration thereof decreases by gradation from the upper part to the lower part of the hard coat layer. In view of the reflectance, the resins or particles having high reflect index exist preferably in such a manner that the concentration thereof decreases by gradation from the upper part to the lower part of the hard coat layer.

Further, in order to raise the pencil hardness of the optical layered body of the present invention, for example, the commonly known reactive silica fine particles, colloidal silica, alumina particles, and the like may be evenly or unevenly dispersed in the hard coat layer.

The antiglare layer refers to a layer on the surface of which roughness (projections and depressions) are formed by the antiglare agent included therein, a layer further having internal dispersion, or a layer having no roughness and having only internal dispersion. The antiglare layer has the function to reduce the reflection of external light on the surface of the optical layered body of the present invention, and the function of diffusing the transmitted light from the inside and the reflected light from the outside.

The antiglare layer is not particularly limited, and one example thereof is a layer formed by a composition for an antiglare layer containing a resin and an antiglare agent.

In the optical layered body of the present invention, the antiglare layer preferably satisfies all of the following numeral equations:

$$30 \leq Sm \leq 600$$

$$0.05 \leq Rz \leq 1.60$$

$$0.1 \leq \theta a \leq 2.5$$

$$0.3 \leq R \leq 15$$

wherein R (μm) denotes the average particle size of fine particles as the antiglare agent; Rz (μm) denotes ten-point mean roughness of the surface roughness of the antiglare layer; Sm (pin) denotes the mean spacing of the surface roughness of the antiglare layer; and θa denotes the mean angle of inclination of surface roughness.

According to another preferred mode of the present invention, when the refractive index of an antiglare agent and that of a resin are n1 and n2, respectively, the antiglare layer preferably satisfies $\Delta n = |n1-n2| < 0.1$, and the haze value in the antiglare layer is preferably 55% or less.

The thickness of the antiglare layer (at the time of curing) is preferably 0.1 to 100 μm. A more preferable lower limit thereof is 0.8 μm, and a more preferable upper limit thereof is 10 μm. When the thickness is in the range, the function as an antiglare layer can be sufficiently exerted.

There may be mentioned fine particles as the antiglare agent. The shape thereof is not particularly limited to a perfect sphere and an elliptical shape, and the perfect sphere is suitably used.

When the antiglare agent is fine particles, it may be made of an inorganic material or an organic material. The fine particles exhibit an antiglare property and are preferably transparent. When the particle size of the fine particles is measured by the Coulter Counter method, the particle size is about 0.1 to 20 μm.

Specifically, as the fine particles made of an inorganic material, there may be mentioned silica beads in an amorphous form, a spherical form, and the like.

Specific examples of the fine particles made of an organic material include styrene beads (refractive index: 1.59), melamine beads (refractive index: 1.57), acryl beads (refractive index: 1.49), acryl-styrene beads (refractive index: 1.53 to 1.58), benzoguanamine-formaldehyde condensate beads (refractive index: 1.66), melamine-formaldehyde condensate beads (refractive index: 1.66), polycarbonate beads (refractive index: 1.57), polyethylene beads (refractive index: 1.50), polyvinyl chloride beads (refractive index: 1.60), and the like. The fine particles made of an organic material may have a hydrophobic group on the surface thereof.

The content of the antiglare agent in the antiglare layer is preferably 0.1 to 30 parts by mass with respect to 100 parts by mass of resin in the antiglare layer. A more preferable lower limit thereof is 1 part by mass, and a more preferable upper limit thereof is 25 parts by mass.

The resin in the antiglare layer is not particularly limited, and examples thereof include: an ionizing radiation curable resin, the same resin which is cured with ultraviolet rays or electron beams; a mixture of the ionizing radiation curable resin and a solvent drying resin; a thermosetting resin; and the like as in the resin described in the above-mentioned hard coat layer.

The antiglare layer can be formed by drying a coat, if necessary, which is formed by applying on the light-transmitting substrate the composition for an antiglare layer prepared by using each of the above-mentioned materials, and curing the composition by ionizing irradiation or heating. The method for preparing the composition for an antiglare layer and the method for forming the coat include the same methods as those described regarding the low refractive index layer.

The hard coat layer and the antiglare layer may further include the below-mentioned antistatic agent, a high refractive index agent, and high hardness and low-curling materials such as colloidal silica.

The optical layered body of the present invention has a structure in which the hard coat layer or the antiglare layer was formed between the light-transmitting substrate and the low refractive index layer, further it may have a structure in which the antistatic layer made of the conventional antistatic agent and binder resin was formed between the hard coat layer or antiglare layer and the light-transmitting substrate or the low refractive index layer.

The antistatic layer is not particularly limited, and there may be mentioned an antistatic layer formed by a composition for an antistatic layer containing a resin and an antistatic agent.

The antistatic agent is not particularly limited, and examples thereof include cationic compounds, such as quarternary ammonium salt, pyridinium salt, and a primary to tertiary amino group; anionic compounds, such as a sulfonic acid salt group, a sulfate salt group, a phosphate salt group, and a phosphonic acid salt group; amphoteric compounds, such as an amino acid and an amino sulfuric acid ester; nonionic compounds, such as an amino alcohol, a glycerin, and a polyethylene glycol; organometallic compounds such as alkoxide of tin and titanium; metal chelate compounds such as an acetylacetonato salt of the organometallic compound; and the like.

As the antistatic agent, compounds formed by polymerizing the compounds described above can also be used.

Further, polymerizable compounds such as monomer or oligomer which has a tertiary amino group, a quaternary ammonium group or a metal chelate portion and is polymerizable with ionizing radiation, and organic metal compounds like a coupling agent having a functional group can also be used as an antistatic agent.

Furthermore, the antistatic agent may be an ionic liquid.

One example of the antistatic agent is a conductive polymer.

The conductive polymer is not particularly limited, and examples thereof include poly(paraphenylene) of an aromatic conjugated, polypyrrole of a heterocyclic conjugated, polythiophene, polyacethylene of an aliphatic conjugated, polyaniline of a hetero-atom-containing conjugated, poly(phenylenevinylene) of a complex conjugated, a multi-chain type conjugated having a plurality of conjugated chains in a molecule, a conductive complex which is a polymer obtained by graft or block copolymerizing the above-mentioned conjugated polymer chain to a saturated polymer, and the like.

The antistatic agent may be a conductive metal oxide fine particle.

The conductive metal oxide fine particle is not particularly limited, and examples thereof include ZnO (refractive index: 1.90, hereinafter, values in a parenthesis all represent a refractive index), $Sb_2O_2$ (1.71), $SnO_2$ (1.997), $CeO_2$ (1.95), indium tin oxide (abbreviation; ITO, 1.95), $In_2O_3$ (2.00), $Al_2O_3$ (1.63), antimony-doped tin oxide (abbreviation; ATO, 2.0), and aluminum-doped zinc oxide (abbreviation; AZO, 20).

Preferably, the antistatic agent is suitably blended with the composition for an antistatic layer as long as the effect of containing the antistatic agent is sufficiently exerted and the above-mentioned effect obtained by the optical layered body to be produced by the present invention is not inhibited.

The resin in the antistatic layer is not particularly limited, and examples thereof include: an ionizing radiation curable resin, the same resin which is cured with ultraviolet rays or electron beams; a mixture of the ionizing radiation curable resin and a solvent drying resin; a thermosetting resin; or the like as in the resin described in the above-mentioned hard coat layer.

The antistatic layer can be formed by drying a coat, if necessary, which is formed by applying on the light-transmitting substrate the composition for an antistatic layer prepared by using each of the above-mentioned materials, and curing the composition by ionizing irradiation or heating. The method for preparing the composition for an antistatic layer and the method for forming the coat include the same methods as those described regarding the low refractive index layer.

The optical layered body of the present invention preferably has an antifouling layer and/or an antistatic layer on the low refractive index layer as long as it does not impair the reflectance of the optical layered body of the present invention.

There may be mentioned the above-mentioned examples as the antifouling layer and the antistatic layer, and examples of the method for manufacturing these layers include those described above.

The optical layered body of the present invention has at least a low refractive index layer on the light-transmitting substrate, and may further include an antifouling layer, a high refractive index layer, a medium refractive index layer, and the like, as optional layers, if necessary, in addition to the above-mentioned hard coat layer or antiglare layer. An antifouling agent, a high refractive index agent, a medium refractive index agent, a low refractive index agent, a resin, and the like, which are usually used, may be added to prepare compositions. With these compositions, the antifouling layer, the high refractive index layer, the medium refractive index layer may be respectively formed by a publicly known method.

The optical layered body of the present invention preferably has total light transmittance of 90% or higher. When the total light transmittance is lower than 90%, color reproducibility and visibility may be reduced when it is provided on the display surface. The total light transmittance is more preferably 95% or higher, and further preferably 98% or higher.

The haze of the optical layered body of the present invention is preferably less than 1%, and more preferably less than 0.5%. When the optical layered body has the antiglare layer, the haze of the optical layered body of the present invention is preferably less than 80%. The haze of the antiglare layer may include a haze by internal diffusion and a haze by surface roughness on the outermost surface. The haze by internal diffusion is preferably 3.0% or higher to less than 79%, and more preferably 10% or higher to less than 50%. The haze of the outermost surface is preferably 1% of higher to less than 35%, more preferably 1% or higher to less than 20%, and further preferably 1% or higher to less than 10%.

One example of a method for manufacturing the optical layered body of the present invention is a method comprising: applying the composition for a hard coat layer, the composition for an antiglare layer, and the composition for an antistatic layer to a light-transmitting substrate, if necessary, to form a hard coat layer, an antiglare layer, and an antistatic layer; and applying the composition for a low refractive index layer on the obtained hard coat layer etc. to form a low refractive index layer.

The method for forming the hard coat layer, the antiglare layer, the antistatic layer, and the low refractive index layer is as mentioned above.

The optical layered body of the present invention is provided on a polarizing element with a surface thereof contacting the side opposite to the side where the low refractive index layer in the optical layered body is present, so that a polarizer is obtained. Such a polarizer also constitutes the present invention.

The polarizing element is not particularly limited, and examples thereof include polyvinyl alcohol films, polyvinyl formal films, polyvinyl acetal films, and ethylene-vinyl acetate copolymer saponified films, which are dyed with iodine or the like and stretched.

In the laminating treatment of the polarizing element and the optical layered body of the present invention, a saponification treatment is preferably performed on the light-transmitting substrate (preferably, triacetyl cellulose film). The fine adhesive property between the polarizing element and the optical layered body and an antistatic effect can be achieved by the saponification treatment.

The present invention also provides an image display device including the optical layered body or the polarizer on the outermost surface. The image display device may be a non-self-luminous image display device such as LCD, or may be a self-luminous image display device such as PDP, FED, ELD (organic EL, inorganic EL) and CRT.

The LCD, which is a typical example of the non-self-luminous image display device, includes a light-transmitting display and a light source device to irradiate the light-transmitting display from the backside. When the image display device of the present invention provides an LCD, the image display device includes the optical layered body of the present invention or the polarizer of the present invention on the surface of this light-transmitting display.

When the present invention provides a liquid crystal display device having the optical layered body, a light source of the light source device irradiates the optical layered body from the bottom side thereof. In addition, in a STN type liquid crystal display device, a retardation plate may be inserted between a liquid crystal display element and the polarizer. An adhesive layer may be provided between the respective layers of this liquid crystal display device if needed.

The PDP, which is the self-luminous image display device, includes a surface glass substrate (electrodes are formed on the surface) and a backside glass substrate (electrodes and fine grooves are formed on the surface and the groove has red, green, and blue phosphor layers therein) that is located at a position opposite to the surface glass substrate with an electric discharge gas filled between these substrates. When the image display device of the present invention is a PDP, the PDP has the optical layered body described above on the surface of the surface glass substrate or on a front plate (glass substrate or film substrate) thereof.

The self-luminous image display device may be an ELD apparatus in which luminous substances of zinc sulfide or diamines capable of emitting light with the application of a voltage are deposited on a glass substrate and display is performed by controlling a voltage to be applied to the substrate. The self-luminous image display device may also be an image display device such as CRT, which converts electric signals to light to generate visible images. In this case, the image display device is provided with the optical layered body described above on the outermost surface of each of the display devices or on the surface of a front plate thereof.

In any case, the optical layered body of the present invention can be used for displays of televisions, computers, word processors, and the like. Particularly, it can be suitably used for the surfaces of high-resolution image displays, such as CRTs, liquid crystal panels, PDPs, ELDs and FEDs.

Effect of the Invention

The optical layered body of the present invention contains a low refractive index layer that excels in hardness and surface evenness and has a sufficiently low refractive index, and is excellent in antireflection properties. Therefore, the optical layered body of the present invention can be suitably applied to cathode ray tube (CRT) display devices, liquid crystal displays (LCD), plasma displays (PDP), electroluminescence displays (ELD), and field emission displays (FED).

BRIEF DESCRIPTIONS OF THE DRAWING

The patent or application file contains at least one drawing executed in color. Copies of this patent or patent application publication with color drawing(s) will be provided by the Office upon request and payment of the necessary fee.

BEST MODE FOR CARRYING OUT THE INVENTION

Figure 1:
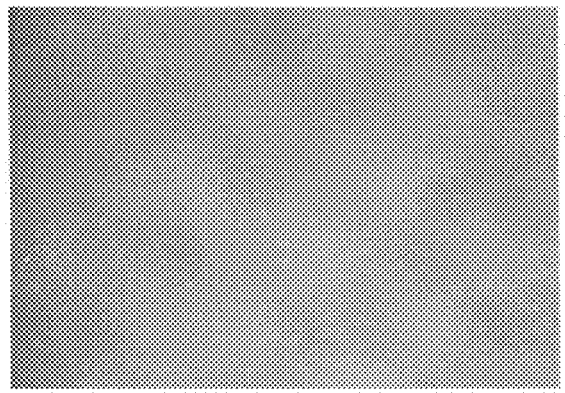
FIG. 1 is a microscope photograph of the surface of an optical layered body according to Example 1.

The present invention will be described by way of the below examples, but the present invention is not to be construed to limit to these embodiments. Words of "part (s)" and "%" refer to "part (s) by mass" and "% by mass", unless otherwise specified. Further, each of the components is a solid content unless otherwise indicated.

Preparation of Composition for Hard Coat Layer

Preparation Example 1

The components shown below were mixed to prepare a composition for a hard coat layer (1).
Urethane acrylate (UV1700B, produced by Nippon Synthetic Chemical Industry Co., Ltd.)
 5 parts by mass
Isocyanuric acid EO-modified triacrylate (M315, produced by Toagosei Co., Ltd.)
 5 parts by mass
Polymerization initiator (Irgacure 184; produced by Ciba Specialty Chemicals Inc.)
 0.4 parts by mass
Methyl ethyl ketone
 10 parts by mass Preparation Example 2

The components shown below were mixed to prepare a composition for a hard coat layer (2).
Urethane acrylate (BS577, produced by Arakawa Chemical Industries, Ltd.)
 2.5 parts by mass
Polyester acrylate (M9050, produced by Toagosei Co., Ltd.)
 5 parts by mass
Antistatic agent-containing compound (Yupimer H6500, produced by Mitsubishi Chemical Corporation; about 20% of quaternary ammonium salt oligomer+about 80% of DPHA)
 2.5 parts by mass based on the solid content Polymerization initiator (Irgacure 184; produced by Ciba Specialty Chemicals Inc.)
 0.4 parts by mass
Methyl ethyl ketone
 10 parts by mass Preparation Example 3

The components shown below were mixed to prepare a composition for a hard coat layer (3).
Dipentaerythritol hexaacrylate (DPHA, produced by Nippon Kayaku Co., Ltd.)
 5 parts by mass
Reactive non-spherical silica (DP1128, produced by JGC Catalysts and Chemicals Ltd., reactive group; methacrylate)
 5 parts by mass based on the solid content Polymerization initiator (Irgacure 184; produced by Ciba Specialty Chemicals Inc.)
 0.4 parts by mass
Methyl ethyl ketone
 10 parts by mass Preparation of Composition for Low Refractive Index Layer Preparation Example 1

The components shown below were mixed to prepare a composition for a low refractive index layer (1).
Hollow treated silica fine particles (solid content: 20% by mass; solution: methyl isobutyl ketone, average particle size: 50 nm)
 73 parts by mass
Fluorine atom-containing polymer (produced by JSR Corp.; Opster JN35, refractive index: 1.41, weight-average molecular weight: 30,000)
 1 part by mass based on the solid content
Fluorine atom-containing monomer (produced by Kyoeisha Chemical Co., Ltd.; LINC3A, refractive index: 1.42)
 7 parts by mass
Pentaerythritol triacrylate (PETA)
 2 parts by mass
Polymerization initiator (Irgacure 127; produced by Ciba Specialty Chemicals Inc.)
 0.35 parts by mass
Modified silicone oil (X22164E; produced by Shin-Etsu Chemical Co., Ltd.)
 0.5 parts by mass
Modified silicone oil (FM7711; produced by Chisso Corporation)
 0.5 parts by mass
MIBK
 320 parts by mass
PGMEA
 161 parts by mass It is to be noted that "LINC3A" (fluorine atom-containing monomer) produced by Kyoeisha Chemical Co., Ltd. is a compound having a structure represented by the following formula (1).

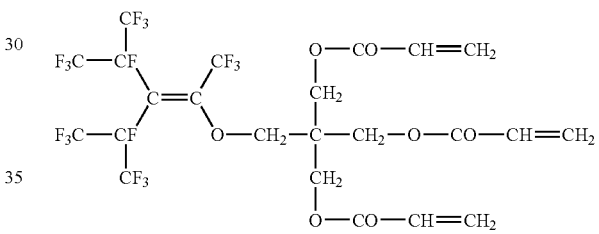

Preparation Example 2

The components shown below were mixed to prepare a composition for a low refractive index layer (2).
Hollow treated silica fine particles (solid content: 20% by mass; solution: methyl isobutyl ketone, average particle size: 50 nm)
 73 parts by mass
Fluorine atom-containing polymer (produced by JSR Corp.; Opster JN35, refractive index: 1.41, weight-average molecular weight: 30,000)
 6 parts by mass based on the solid content
Fluorine atom-containing monomer (produced by Kyoeisha Chemical Co., Ltd.; LINC3A, refractive index: 1.42)
 3 parts by mass
Pentaerythritol triacrylate (PETA)
 1 part by mass
Polymerization initiator (Irgacure 127; produced by Ciba Specialty Chemicals Inc.)
 0.35 parts by mass
Modified silicone oil (X22164E; produced by Shin-Etsu Chemical Co., Ltd.)
 0.5 parts by mass
Modified silicone oil (FM7711; produced by Chisso Corporation)
 0.5 parts by mass
MIBK
 320 parts by mass
PGMEA
 161 parts by mass

Preparation Example 3

The components shown below were mixed to prepare a composition for a low refractive index layer (3).
Hollow treated silica fine particles (solid content: 20% by mass; solution: methyl isobutyl ketone, average particle size: 50 nm)
  73 parts by mass
Fluorine atom-containing polymer (produced by JSR Corp.; Opster JN35, refractive index: 1.41, weight-average molecular weight: 30,000)
  7 parts by mass based on the solid content
Fluorine atom-containing monomer (produced by Kyoeisha Chemical Co., Ltd.; LINC3A, refractive index: 1.42)
  1 part by mass
Pentaerythritol triacrylate (PETA)
  2 parts by mass
Polymerization initiator (Irgacure 127; produced by Ciba Specialty Chemicals Inc.)
  0.35 parts by mass
Modified silicone oil (X22164E; produced by Shin-Etsu Chemical Co., Ltd.)
  0.5 parts by mass
Modified silicone oil (FM7711; produced by Chisso Corporation)
  0.5 parts by mass
MIBK
  320 parts by mass
PGMEA
  161 parts by mass

Preparation Example 4

The components shown below were mixed to prepare a composition for a low refractive index layer (4).
Hollow treated silica fine particles (solid content: 20% by mass; solution: methyl isobutyl ketone, average particle size: 50 nm)
  73 parts by mass
Fluorine atom-containing polymer (produced by JSR Corp.; Opster JN35, refractive index: 1.41, weight-average molecular weight: 30,000)
  1 part by mass based on the solid content
Fluorine atom-containing monomer (produced by Kyoeisha Chemical Co., Ltd.; LINC3A, refractive index: 1.42)
  3 parts by mass
Pentaerythritol triacrylate (PETA)
  6 parts by mass
Polymerization initiator (Irgacure 127; produced by Ciba Specialty Chemicals Inc.)
  0.35 parts by mass
Modified silicone oil (X22164E; produced by Shin-Etsu Chemical Co., Ltd.)
  0.5 parts by mass
Modified silicone oil (FM7711; produced by Chisso Corporation)
  0.5 parts by mass
MIBK
  320 parts by mass
PGMEA
  161 parts by mass

Preparation Example 5

The components shown below were mixed to prepare a composition for a low refractive index layer (5).
Hollow treated silica fine particles (solid content: 20% by mass; solution: methyl isobutyl ketone, average particle size: 50 nm)
  73 parts by mass
Fluorine atom-containing polymer (produced by JSR Corp.; Opster JN35, refractive index: 1.41, weight-average molecular weight: 30,000)
  4.5 parts by mass based on the solid content
Fluorine atom-containing monomer (produced by Kyoeisha Chemical Co., Ltd.; LINC3A, refractive index: 1.42)
  4.5 parts by mass
Pentaerythritol triacrylate (PETA)
  1 part by mass
Polymerization initiator (Irgacure 127; produced by Ciba Specialty Chemicals Inc.)
  0.35 parts by mass
Modified silicone oil (X22164E; produced by Shin-Etsu Chemical Co., Ltd.)
  0.5 parts by mass
Modified silicone oil (FM7711; produced by Chisso Corporation)
  0.5 parts by mass
MIBK
  320 parts by mass
PGMEA
  161 parts by mass

Preparation Example 6

The components shown below were mixed to prepare a composition for a low refractive index layer (6).
Hollow treated silica fine particles (solid content: 20% by mass; solution: methyl isobutyl ketone, average particle size: 50 nm)
  73 parts by mass
Fluorine atom-containing polymer (produced by Daikin Industries, Ltd.; Optool AR110, refractive index: 1.39, weight-average molecular weight: 150,000)
  1 part by mass based on the solid content
Fluorine atom-containing monomer (produced by Kyoeisha Chemical Co., Ltd.; LINC3A, refractive index: 1.42)
  7 parts by mass
Pentaerythritol triacrylate (PETA)
  2 parts by mass
Polymerization initiator (Irgacure 127; produced by Ciba Specialty Chemicals Inc.)
  0.35 parts by mass
Modified silicone oil (X22164E; produced by Shin-Etsu Chemical Co., Ltd.)
  0.5 parts by mass
Modified silicone oil (FM7711; produced by Chisso Corporation)
  0.5 parts by mass
MIBK
  320 parts by mass
PGMEA
  161 parts by mass Preparation Example 7

The components shown below were mixed to prepare a composition for a low refractive index layer (7).
Hollow treated silica fine particles (solid content: 20% by mass; solution: methyl isobutyl ketone, average particle size: 50 nm)
  73 parts by mass
Fluorine atom-containing polymer (produced by JSR Corp.; refractive index: 1.41, weight-average molecular weight: 150,000)
  1 part by mass based on the solid content
Fluorine atom-containing monomer (produced by Kyoeisha Chemical Co., Ltd.; LINC102A, refractive index: 1.40)
  7 parts by mass
Pentaerythritol triacrylate (PETA)
  2 parts by mass
Polymerization initiator (Irgacure 127; produced by Ciba Specialty Chemicals Inc.)
  0.35 parts by mass
Modified silicone oil (X22164E; produced by Shin-Etsu Chemical Co., Ltd.)
  0.5 parts by mass
Modified silicone oil (FM7711; produced by Chisso Corporation)
  0.5 parts by mass
MIBK
  320 parts by mass
PGMEA
  161 parts by mass It is to be noted that "LINC102A" (fluorine atom-containing monomer) produced by Kyoeisha Chemical Co., Ltd. is a compound having a structure represented by the following chemical formula (11).

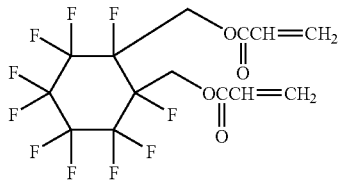

(11)

Preparation Example 8

The components shown below were mixed to prepare a composition for a low refractive index layer (8).
Hollow treated silica fine particles (solid content: 20% by mass; solution: methyl isobutyl ketone, average particle size: 50 nm)
  73 parts by mass
Fluorine atom-containing polymer (produced by JSR Corp.; refractive index: 1.42, weight-average molecular weight: 15,000)
  1 part by mass based on the solid content
Fluorine atom-containing monomer (produced by Kyoeisha Chemical Co., Ltd.; LINC3A, refractive index: 1.42)
  7 parts by mass
Pentaerythritol triacrylate (PETA)
  2 parts by mass
Polymerization initiator (Irgacure 127; produced by Ciba Specialty Chemicals Inc.)
  0.35 parts by mass
Modified silicone oil (X22164E; produced by Shin-Etsu Chemical Co., Ltd.)
  0.5 parts by mass
Modified silicone oil (FM7711; produced by Chisso Corporation)
  0.5 parts by mass
MIBK
  320 parts by mass
PGMEA
  161 parts by mass Preparation Example 9

The components shown below were mixed to prepare a composition for a low refractive index layer (9).
Hollow treated silica fine particles (solid content: 20% by mass; solution: methyl isobutyl ketone, average particle size: 50 nm)
  73 parts by mass
Fluorine atom-containing polymer (produced by JSR Corp.; Opster JN35, refractive index: 1.41, weight-average molecular weight: 30,000)
  1 part by mass based on the solid content
Fluorine atom-containing monomer (produced by Kyoeisha Chemical Co., Ltd.; LINC3A, refractive index: 1.42)
  7 parts by mass
Dipentaerythritol hexaacrylate (DPHA)
  2 parts by mass
Polymerization initiator (Irgacure 127; produced by Ciba Specialty Chemicals Inc.)
  0.35 parts by mass
Modified silicone oil (X22164E; produced by Shin-Etsu Chemical Co., Ltd.)
  0.5 parts by mass
Modified silicone oil (FM7711; produced by Chisso Corporation)
  0.5 parts by mass
MIBK
  320 parts by mass
PGMEA
  161 parts by mass Preparation Example 10

The components shown below were mixed to prepare a composition for a low refractive index layer (10).
Hollow treated silica fine particles (solid content: 20% by mass; solution: methyl isobutyl ketone, average particle size: 50 nm)
  73 parts by mass
Fluorine atom-containing polymer (produced by JSR Corp.; Opster JN35, refractive index: 1.41, weight-average molecular weight: 30,000)
  1 part by mass based on the solid content
Fluorine atom-containing monomer (produced by Kyoeisha Chemical Co., Ltd.; LINC3A, refractive index: 1.42)
  7 parts by mass
Pentaerythritol triacrylate (PETA)
  2 parts by mass
Colloidal silica (produced by Nissan Chemical Industries Ltd., MIBKSTF, particle size: 12 nm, surface modification article)
  0.5 parts by mass Polymerization initiator (Irgacure 127; produced by Ciba Specialty Chemicals Inc.)
    0.35 parts by mass
Modified silicone oil (X22164E; produced by Shin-Etsu Chemical Co., Ltd.)
    0.5 parts by mass
Modified silicone oil (FM7711; produced by Chisso Corporation)
    0.5 parts by mass
MIBK
    320 parts by mass
PGMEA
    161 parts by mass Preparation Example 11

The components shown below were mixed to prepare a composition for a low refractive index layer (11).
Hollow treated silica fine particles (solid content: 20% by mass; solution: methyl isobutyl ketone, average particle size: 50 nm)
    73 parts by mass
Fluorine atom-containing polymer (produced by JSR Corp.; Opster JN35, refractive index: 1.41, weight-average molecular weight: 30,000)
    8 part by mass based on the solid content
Fluorine atom-containing monomer (produced by Kyoeisha Chemical Co., Ltd.; LINC3A, refractive index: 1.42)
    0.4 parts by mass
Pentaerythritol triacrylate (PETA)
    1.6 parts by mass
Polymerization initiator (Irgacure 127; produced by Ciba Specialty Chemicals Inc.)
    0.35 parts by mass
Modified silicone oil (X22164E; produced by Shin-Etsu Chemical Co., Ltd.)
    0.5 parts by mass
Modified silicone oil (FM7711; produced by Chisso Corporation)
    0.5 parts by mass
MIBK
    320 parts by mass
PGMEA
    161 parts by mass Preparation Example 12

The components shown below were mixed to prepare a composition for a low refractive index layer (12).
Hollow treated silica fine particles (solid content: 20% by mass; solution: methyl isobutyl ketone, average particle size: 50 nm)
    73 parts by mass
Fluorine atom-containing polymer (produced by JSR Corp.; Opster JN35, refractive index: 1.41, weight-average molecular weight: 30,000)
    1.5 parts by mass based on the solid content
Fluorine atom-containing monomer (produced by Kyoeisha Chemical Co., Ltd.; LINC3A, refractive index: 1.42)
    5.5 parts by mass
Pentaerythritol triacrylate (PETA)
    3.5 parts by mass
Polymerization initiator (Irgacure 127; produced by Ciba Specialty Chemicals Inc.)
    0.35 parts by mass
Silicone/fluorine-containing antifouling agent (TU2225; produced by JSR Corp.)
    0.5 parts by mass
MIBK
    320 parts by mass
PGMEA
    161 parts by mass Preparation Example 13

The components shown below were mixed to prepare a composition for a low refractive index layer (13).
Hollow treated silica fine particles (solid content: 20% by mass; solution: methyl isobutyl ketone, average particle size: 50 nm)
    73 parts by mass
Fluorine atom-containing polymer (produced by JSR Corp.; Opster JN35, refractive index: 1.41, weight-average molecular weight: 30,000)
    7 parts by mass based on the solid content
Fluorine atom-containing monomer (produced by Kyoeisha Chemical Co., Ltd.; LINC3A, refractive index: 1.42)
    1 part by mass
Pentaerythritol triacrylate (PETA)
    2 parts by mass
Polymerization initiator (Irgacure 127; produced by Ciba Specialty Chemicals Inc.)
    0.35 parts by mass
Silicone/fluorine-containing antifouling agent (TU2225; produced by JSR Corp.)
    0.5 parts by mass
MIBK
    320 parts by mass
PGMEA
    161 parts by mass Preparation Example 14

The components shown below were mixed to prepare a composition for a low refractive index layer (14).
Hollow treated silica fine particles (solid content: 20% by mass; solution: methyl isobutyl ketone, average particle size: 50 nm)
    56 parts by mass
Fluorine atom-containing polymer (produced by JSR Corp.; Opster JN35, refractive index: 1.41, weight-average molecular weight: 30,000)
    7 parts by mass based on the solid content
Fluorine atom-containing monomer (produced by Kyoeisha Chemical Co., Ltd.; LINC3A, refractive index: 1.42)
    1 part by mass
Pentaerythritol triacrylate (PETA)
    2 parts by mass
Reactive silica (MIBK-SD produced by Nissan Chemical Industries Ltd.; particle size: 12 nm, reactive group: methacrylate)
    3 parts by mass
Polymerization initiator (Irgacure 127; produced by Ciba Specialty Chemicals Inc.)
    0.35 parts by mass
Silicone/fluorine-containing antifouling agent (TU2225; produced by JSR Corp.)
    0.5 parts by mass
MIBK
    320 parts by mass
PGMEA
    161 parts by mass

Preparation Example 15

The components shown below were mixed to prepare a composition for a low refractive index layer (15).
Hollow treated silica fine particles (solid content: 20% by mass; solution: methyl isobutyl ketone, average particle size: 50 nm)
 73 parts by mass
Fluorine atom-containing polymer (produced by JSR Corp.; Opster JN35, refractive index: 1.41, weight-average molecular weight: 30,000)
 1.5 parts by mass based on the solid content
Fluorine atom-containing monomer (produced by Kyoeisha Chemical Co., Ltd.; LINC3A, refractive index: 1.42)
 5.5 parts by mass
Pentaerythritol triacrylate (PETA)
 2.5 parts by mass
Reactive silica (produced by JGC Catalysts and Chemicals Ltd.; DP1129, particle size: 7 nm, reactive group: methacrylate)
 1 part by mass
Polymerization initiator (Irgacure 127; produced by Ciba Specialty Chemicals Inc.)
 0.35 parts by mass
Silicone/fluorine-containing antifouling agent (TU2225; produced by JSR Corp.)
 0.5 parts by mass
MIBK
 320 parts by mass
PGMEA
 161 parts by mass

Preparation Example 16

The components shown below were mixed to prepare a composition for a low refractive index layer (16).
Hollow treated silica fine particles (solid content: 20% by mass; solution: methyl isobutyl ketone, average particle size: 50 nm)
 73 parts by mass
Fluorine atom-containing polymer (produced by JSR Corp.; Opster JN35, refractive index: 1.41, weight-average molecular weight: 30,000)
 1.5 parts by mass based on the solid content
Fluorine atom-containing monomer (produced by Kyoeisha Chemical Co., Ltd.; LINC3A, refractive, index: 1.42)
 5.5 parts by mass
Pentaerythritol triacrylate (PETA)
 3.5 parts by mass
Polymerization initiator (Irgacure 127; produced by Ciba Specialty Chemicals Inc.)
 0.35 parts by mass
Silicone/fluorine-containing antifouling agent (TU2225; produced by JSR Corp.)
 0.25 parts by mass
Modified silicone antifouling agent (FM7711; produced by Chisso Corporation)
 0.25 parts by mass
MIBK
 320 parts by mass
PGMEA
 161 parts by mass

Preparation Example 17

The components shown below were mixed to prepare a composition for a low refractive index layer (17).
Hollow treated silica fine particles (solid content: 20% by mass; solution: methyl isobutyl ketone, average particle size: 50 nm)
 73 parts by mass
Pentaerythritol triacrylate (PETA)
 10 parts by mass
Polymerization initiator (Irgacure 127; produced by Ciba Specialty Chemicals Inc.)
 0.35 parts by mass
Silicone oil (X22164E; produced by Shin-Etsu Chemical Co., Ltd.)
 1 part by mass
MIBK
 320 parts by mass
PGMEA
 161 parts by mass

Preparation Example 18

The components shown below were mixed to prepare a composition for a low refractive index layer (18).
Hollow treated silica fine particles (solid content: 20% by mass; solution: methyl isobutyl ketone, average particle size: 50 nm)
 73 parts by mass
Fluorine atom-containing polymer (produced by JSR Corp.; Opster JN35, refractive index: 1.41, weight-average molecular weight: 30,000) 10 parts by mass based on the solid content
Polymerization initiator (Irgacure 127; produced by Ciba Specialty Chemicals Inc.)
 0.35 parts by mass
Silicone oil (X22164E; produced by Shin-Etsu Chemical Co., Ltd.)
 1 part by mass
MIBK
 320 parts by mass
PGMEA
 161 parts by mass

Preparation Example 19

The components shown below were mixed to prepare a composition for a low refractive index layer (19).
Hollow treated silica fine particles (solid content: 20% by mass; solution: methyl isobutyl ketone, average particle size: 50 nm)
 73 parts by mass
Fluorine atom-containing monomer (produced by Kyoeisha Chemical Co., Ltd.; LINC3A, refractive index: 1.42) 10 parts by mass
Polymerization initiator (Irgacure 127; produced by Ciba Specialty Chemicals Inc.)
 0.35 parts by mass
Silicone oil (X22164E; produced by Shin-Etsu Chemical Co., Ltd.)
 1 part by mass
MIBK
 320 parts by mass
PGMEA
 161 parts by mass

Preparation Example 20

The components shown below were mixed to prepare a composition for a low refractive index layer (20).
Hollow treated silica fine particles (solid content: 20% by mass; solution: methyl isobutyl ketone, average particle size: 50 nm)
  73 parts by mass
Fluorine atom-containing polymer (produced by JSR Corp.; Opster JN35, refractive index: 1.41, weight-average molecular weight: 30,000)
  3 parts by mass based on the solid content
Fluorine atom-containing monomer (LINC3A produced by Kyoeisha Chemical Co., Ltd.; refractive index: 1.42) 3 parts by mass Isocyanuric acid EO-modified diacrylate (produced by Toagosei Co., Ltd.; M215, bifunctional)
  4 parts by mass
Polymerization initiator (Irgacure 127; produced by Ciba Specialty Chemicals Inc.)
  0.35 parts by mass
Silicone oil (X22164E; produced by Shin-Etsu Chemical Co., Ltd.)
  1 part by mass
MIBK
  320 parts by mass
PGMEA
  161 parts by mass

Preparation Example 21

The components shown below were mixed to prepare a composition for a low refractive index layer (21).
Hollow treated silica fine particles (solid content: 20% by mass; solution: methyl isobutyl ketone, average particle size: 50 nm)
  73 parts by mass
Fluorine atom-containing polymer (produced by JSR Corp.; Opster JN35, refractive index: 1.41, weight-average molecular weight: 30,000)
  0.5 parts by mass based on the solid content
Fluorine atom-containing monomer (produced by Kyoeisha Chemical Co., Ltd.; LINC3A, refractive index: 1.42) 0.5 parts by mass
Isocyanuric acid EO-modified diacrylate (produced by Toagosei Co., Ltd.; M215, bifunctional)
  9 parts by mass
Polymerization initiator (Irgacure 127; produced by Ciba Specialty Chemicals Inc.)
  0.35 parts by mass
Silicone oil (X22164E; produced by Shin-Etsu Chemical Co., Ltd.)
  1 part by mass
MIBK
  320 parts by mass
PGMEA
  161 parts by mass

Preparation Example 22

The components shown below were mixed to prepare a composition for a low refractive index layer (22).
Hollow treated silica fine particles (solid content: 20% by mass; solution: methyl isobutyl ketone, average particle size: 50 nm)
  73 parts by mass
Fluorine atom-containing polymer (produced by JSR Corp.; Opster JN35, refractive index: 1.41, weight-average molecular weight: 30,000)
  1 part by mass based on the solid content
Fluorine atom-containing monomer (produced by Kyoeisha Chemical Co., Ltd.; LINC3A, refractive index: 1.42)
  7 parts by mass
Isocyanuric acid EO-modified diacrylate (produced by Toagosei Co., Ltd.; M215, bifunctional)
  2 parts by mass
Polymerization initiator (Irgacure 127; produced by Ciba Specialty Chemicals Inc.)
  0.35 parts by mass
Modified silicone oil (X22164E; produced by Shin-Etsu Chemical Co., Ltd.)
  0.5 part by mass
Modified silicone oil (FM7711; produced by Chisso Corporation)
  0.5 parts by mass
MIBK
  320 parts by mass
PGMEA
  161 parts by mass

Example 1

A composition for a hard coat layer (1) having a wet weight of 30 g/m$^2$ (dry weight of 15 g/m$^2$) was applied to one side of a cellulose triacetate film (80 μm in thickness). The composition was dried for 30 seconds at 70° C. and irradiated with ultraviolet rays (50 mJ/cm$^2$) to form a hard coat layer (1).

Subsequently, a composition for a low refractive index layer (1) was applied to the formed hard coat layer (1) to have a film thickness of 0.1 μm after drying (at a temperature of 40° C. for 1 minute). The dried composition was cured by irradiated with ultraviolet light (radiation dose: 192 mJ/cm$^2$) with the use of an ultraviolet irradiation apparatus (produced by Fusion UV Systems Japan K.K., light source: H valve) to form an optical layered body. The film thickness was adjusted in such a manner that the minimum of reflectance reached the wavelength of around 550 nm.

Examples 2 to 16, and Comparative Examples 1 to 6

Optical layered bodies according to Examples 2 to 16 and Comparative Examples 1 to 6 were obtained in the same manner as in Example 1, except that composition for low refractive index layer (2) to (22) were used instead of the composition for a low refractive index layer (1). Optical layered bodies according to Examples 17 and 18 were obtained in the same manner as in Example 1, except that the composition for hard coat layer (2) and (3) were used instead of the composition for a hard coat layer (1), respectively.

(Evaluation)

Evaluation was made on optical layered bodies obtained in Examples and Comparative Examples. Table 1 shows the results.

(Measurement of Reflectance)

A black tape for preventing back reflection was stuck to each of the obtained optical layered bodies, and the minimum reflectance at a wavelength band of 380 to 780 nm was measured from the surface of the low refractive index layer by using a spectral reflectance measuring device "PC-3100" produced by Shimadzu Corporation. The results were evaluated based on the following criteria.

lamp from the side on which the low refractive index layer was formed. The results were evaluated based on the following criteria.

Evaluation Criteria

Good: The coated surface was even and smooth.

Poor: The coated surface was uneven and rough with color irregularities and stripe patterns.

TABLE 1

| | Composition for hard coat layer | Composition for low refractive index layer | Reflectance | Scratch resistance | Coated surface | Whitening |
|---|---|---|---|---|---|---|
| Example 1 | (1) | (1) | Good | Good | Good | Good |
| Example 2 | (1) | (2) | Good | Good | Good | Good |
| Example 3 | (1) | (3) | Good | Good | Good | Good |
| Example 4 | (1) | (4) | Good | Good | Good | Good |
| Example 5 | (1) | (5) | Good | Good | Good | Good |
| Example 6 | (1) | (6) | Good | Good | Good | Good |
| Example 7 | (1) | (7) | Good | Good | Good | Good |
| Example 8 | (1) | (8) | Good | Good | Good | Good |
| Example 9 | (1) | (9) | Good | Good | Good | Good |
| Example 10 | (1) | (10) | Good | Good | Good | Good |
| Example 11 | (1) | (11) | Good | Good | Good | Good |
| Example 12 | (1) | (12) | Good | Good | Good | Good |
| Example 13 | (1) | (13) | Good | Good | Good | Good |
| Example 14 | (1) | (14) | Good | Good | Good | Good |
| Example 15 | (1) | (15) | Good | Good | Good | Good |
| Example 16 | (1) | (16) | Good | Good | Good | Good |
| Example 17 | (2) | (1) | Good | Good | Good | Good |
| Example 18 | (3) | (1) | Good | Good | Good | Good |
| Comparative Example 1 | (1) | (17) | Poor | Good | Good | Good |
| Comparative Example 2 | (1) | (18) | Good | Poor | Good | Good |
| Comparative Example 3 | (1) | (19) | Good | Good | Poor | Good |
| Comparative Example 4 | (1) | (20) | Good | Poor | Good | Poor |
| Comparative Example 5 | (1) | (21) | Poor | Poor | Good | Good |
| Comparative Example 6 | (1) | (22) | Good | Poor | Good | Good |

Evaluation Criteria
Good: The minimum reflectance was less than 1.3%.
Poor: The minimum reflectance was 1.3% or more.
(Evaluation of Whitening)

The haze value (%) of the low refractive index layer of the obtained optical layered body of each of the obtained Examples and Comparative Examples was measured in conformity with JIS K-7136 by using a haze meter (Murakami Color Research Laboratory Co., Ltd., product number; HM-150). The results were evaluated based on the following criteria.
Good: less than 0.5%
Poor: 0.5% or more
(Scratch Resistance Test)

The surface of the low refractive index layer of the optical layered body was rubbed back and forth 10 times at a prescribed friction load of 300 g/cm² by using a steel wool of #0000, and thereafter the presence of peeling of the rubbed coat was visually observed. The results were evaluated based on the following criteria.
Evaluation Criteria
Good: no scratch observed
Poor: scratches observed
(Coated Surface)

A black tape was stuck on the film surface on the side on which the low refractive index layer was not formed, and the coated surface was visually observed with a three-wavelength Table 1 reveals that the optical layered bodies of Examples were excellent in the respective evaluations of reflectance, hardness, and a coated surface, and whitening was not observed in low refractive index layers. FIG. 1 illustrates a microphotograph of the surface of the optical layered body according to Example 1. On the other hand, sufficient reflection properties were not obtained in the optical layered body of Comparative Example 1 in which the composition for a low refractive index layer did not contain a fluorine atom-containing monomer and a fluorine atom-containing polymer. In Comparative Example 2 in which the composition for a low refractive index layer did not contain a fluorine atom-containing monomer, sufficient hardness was not obtained in the low refractive index layer. In Comparative Example 3 in which the composition for a low refractive index layer did not contain a fluorine atom-containing polymer, cissing occurred on the surface coated with the composition on the hard coat layer, leading to an uneven coated surface.

Sufficient hardness was not obtained and scratch resistance was inferior in optical layered bodies of Comparative Examples 4, 5, and 6 each of which contains a fluorine atom-free monomer having two reactive functional groups in one molecule (bifunctional).

Figure 2:
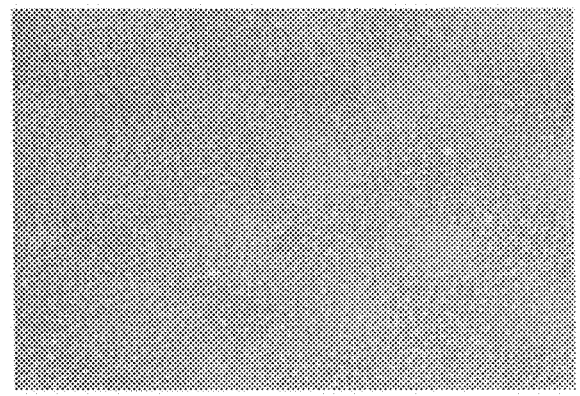
FIG. 2 is a microscope photograph of the surface of an optical layered body according to Comparative Example 4.

In Comparative Example 4 in which the blending amount of a fluorine atom-containing monomer and that of a fluorine atom-containing polymer in the organic binder of the composition for a low refractive index layer were 30% by mass, whitening occurred in the low refractive index layer. FIG. 2 illustrates a microphotograph of the surface of the optical layered body according to Comparative Example 4.

In Comparative Example 5 in which the blending amount of a fluorine atom-containing monomer and that of a fluorine atom-containing polymer in the organic binder of the composition for a low refractive index layer were 5% by mass, antireflection properties were inferior to those in Examples.

INDUSTRIAL APPLICABILITY

Since the optical layered body of the present invention has a low refractive index layer that comprises the above-mentioned configuration, the optical layered body is excellent in antireflection properties and hardness, and no coating problem occurs at the time of production, with the result that it is possible to form a low refractive index layer having an even surface. Thus, the optical layered body of the present invention is suitably applicable to a cathode-ray tube display (CRT), a liquid crystal display (LCD), a plasma display (PDP), an electroluminescence display (ELD), a field emission display (FED), and the like.

The invention claimed is:

1. An optical layered body, comprising:
at least a low refractive index layer on a light-transmitting substrate,
wherein said low refractive index layer is formed by using a composition for a low refractive index layer, said composition comprising a hollow silica fine particle and an organic binder, said organic binder containing: a fluorine atom-free polyfunctional monomer having three or more reactive functional groups in one molecule; a fluorine atom-containing monomer; and a fluorine atom-containing polymer;
wherein said fluorine atom-containing monomer is a fluorine atom-containing monomer having a pentaerythritol skeleton which contains at least one member selected from the group consisting of the following chemical formulae (2), (3) and (4)

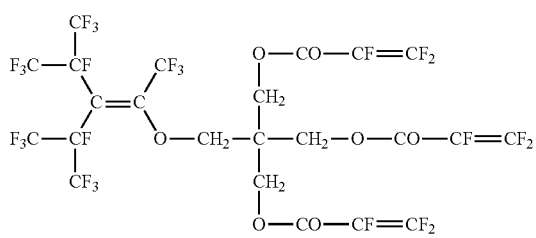

(2)

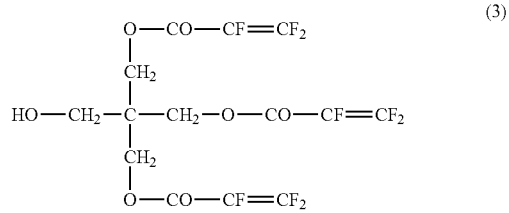

(3)

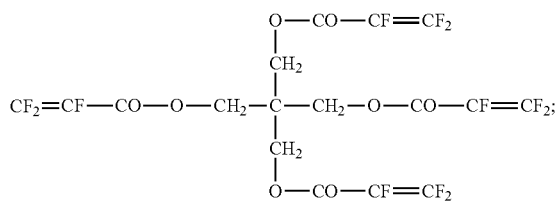

(4)

wherein the weight-average molecular weight of the fluorine atom-containing monomer is 500 or more and 5000 or less;
the fluorine atom-containing polymer contains a compound containing a silicon atom in a part of one molecule; wherein the polymer containing a silicon atom is obtained from a silicon component selected from the group consisting of (poly)dimethylsiloxane, (poly)diethylsiloxane, (poly)diphenylsiloxane, (poly)methylphenylsiloxane, alkyl-modified (poly)dimethylsiloxane, azo group-containing (poly)dimethylsiloxane, dimethylsilicone, phenylmethylsilicone, alkyl/aralkyl-modified silicone, polyether-modified silicone, fatty acid ester-modified silicone, methyl hydrogenated silicone, silanol group-containing silicone, alkoxyl group-containing silicone, phenol group-containing silicone, methacryl-modified silicone, acryl-modified silicone, amino-modified silicone, carboxylic acid-modified silicone, carbinol-modified silicone, epoxy-modified silicone, mercapto-modified silicone, and polyether-modified silicone;
and the weight-average molecular weight of the fluorine atom-containing polymer is 10,000 or more, and 50,000 or less; and
wherein an amount (Fm) of the fluorine atom-containing monomer and an amount (Fp) of the fluorine atom-containing polymer in the organic binder are represented by one of (1), (2) and (3) and fulfilled Fm+Fp<100% by mass:
(1) 40% by mass<Fp<99% by mass when 0% by mass<Fm≤5% by mass;
(2) 0% by mass<Fp≤20% by mass or 40% by mass<Fp<99% by mass when 5% by mass<Fm≤30% by mass;
(3) 0% by mass<Fp≤70% by mass when 30% by mass<Fm<99% by mass.

2. The optical layered body according to claim 1, wherein
the fluorine atom-containing polymer has ten or more reactive functional groups in one molecule.

3. The optical layered body according to claim 2, wherein the fluorine atom-free polyfunctional monomer is at least one monomer selected from the group consisting of pentaerythritol tri(meth)acrylate, dipentaerythritol hexa(meth)acrylate, pentaerythritol tetra(meth)acrylate, dipentaerythritol penta(meth)acrylate, trimethylolpropane tri(meth)acrylate, dipentaerythritol tetra(meth)acrylate, and isocyanuric acid EO-modified tri(meth)acrylate.

4. The optical layered body according to claim 1, wherein the fluorine atom-free polyfunctional monomer is at least one monomer selected from the group consisting of pentaerythritol tri(meth)acrylate, dipentaerythritol hexa(meth)acrylate, pentaerythritol tetra(meth)acrylate, dipentaerythritol penta(meth)acrylate, trimethylolpropane tri(meth)acrylate, dipentaerythritol tetra(meth)acrylate, and isocyanuric acid EO-modified tri(meth)acrylate.

5. The optical layered body according to claim 1, wherein the composition for a low refractive index layer contains silica fine particles having a reactive functional group on a surface in a ratio of 40% by mass or less with respect to 100% by mass of the total of the silica fine particles and the organic binder.

6. The optical layered body according to claim 1, wherein the low refractive index layer has a refractive index of less than 1.45.

7. The optical layered body according to claim 1, wherein at least one layer selected from the group consisting of a hard coat layer, an antiglare layer, and an antistatic layer is provided between the light-transmitting substrate and the low refractive index layer.

8. The optical layered body according to claim 1, wherein an antifouling layer and/or an antistatic layer are provided on the low refractive index layer.

9. A polarizer, comprising:
a polarizing element,
wherein said polarizer includes the optical layered body according to claim 1, on a surface of the polarizing element.

10. An image display device, comprising:
the optical layered body according to claim 1, on the outermost surface.

* * * * *